United States Patent [19]
Jones, III

[11] Patent Number: 5,520,004
[45] Date of Patent: May 28, 1996

[54] APPARATUS AND METHODS FOR CRYOGENIC TREATMENT OF MATERIALS

[76] Inventor: Robert H. Jones, III, 221 Verot School Rd., Apt. 122, Lafayette, La. 70508

[21] Appl. No.: 267,782

[22] Filed: Jun. 28, 1994

[51] Int. Cl.$^6$ .............. F25D 3/11; F25D 13/06; F25D 25/00
[52] U.S. Cl. .............. 62/63; 62/65; 62/266; 62/268; 62/374; 62/380
[58] Field of Search .............. 62/63, 64, 266, 62/268, 100, 374, 380, 65; 34/92

[56] References Cited

U.S. PATENT DOCUMENTS

| | | | |
|---|---|---|---|
| 1,857,122 | 5/1932 | Sherman | 62/380 X |
| 1,862,638 | 6/1932 | Spreen | 62/380 X |
| 1,892,224 | 12/1932 | Sorber | 62/380 X |
| 1,939,334 | 12/1933 | Burke | 62/374 X |
| 2,019,551 | 11/1935 | Varney | 62/380 X |
| 2,212,916 | 8/1940 | Hawkins et al. | 62/380 |
| 2,418,746 | 4/1947 | Bartlett et al. | 62/63 |
| 2,534,334 | 12/1950 | Ahlstrand | 62/122 X |
| 2,552,029 | 5/1951 | Bludeau et al. | 62/374 |
| 2,996,898 | 8/1961 | Hosken et al. | 62/268 |
| 3,427,820 | 2/1969 | Hart . | |
| 3,601,901 | 8/1971 | Rader | 34/92 |
| 3,648,379 | 3/1972 | Mercer et al. | 34/92 X |
| 3,681,851 | 8/1972 | Fleming | 62/65 X |
| 3,864,840 | 2/1975 | Baskin | 34/92 X |
| 4,025,990 | 5/1977 | Lovette, Jr. | 241/14 |
| 4,072,026 | 2/1978 | Oberpriller et al. | 62/63 |
| 4,075,869 | 2/1978 | Fitsall | 62/374 |
| 4,336,694 | 6/1982 | Schmitt et al. | 62/374 |
| 4,350,027 | 9/1982 | Tyree, Jr. | 62/374 |
| 4,589,264 | 5/1986 | Astrom | 62/374 |
| 4,657,768 | 4/1987 | Nagoshi | 62/63 X |
| 4,741,168 | 5/1988 | Boyer et al. | 62/374 X |
| 4,852,358 | 8/1989 | Acharya et al. | 62/63 |
| 4,858,445 | 8/1989 | Rasovich | 62/374 |
| 5,218,826 | 6/1993 | Kirschner | 62/64 X |
| 5,259,212 | 10/1993 | Engler | 62/64 X |

*Primary Examiner*—Christopher Kilner
*Attorney, Agent, or Firm*—Roy, Kiesel & Tucker

[57] ABSTRACT

The invention includes a tunnel-conveyor section designed to process large-scale quantities of such materials as automobile tires for frangiation and embrittlement to low- or cryogenic-temperature levels for separation of fibrous and metal portions and subsequent granulation into fine-mesh particles. The system is also designed to subject food products to low- or cryogenic-temperature levels prior to for long-term storage and shipping as well. The system can also be used for freeze drying at very low temperatures (−380° F. and lower) when nonconveyor procedures are used. The unit can be adapted as a horizontal-cylinder as well as a spiral or circular system for large-scale conveyor operations. Smaller systems can also be fabricated for laboratory or smaller-scale procedures.

47 Claims, 13 Drawing Sheets

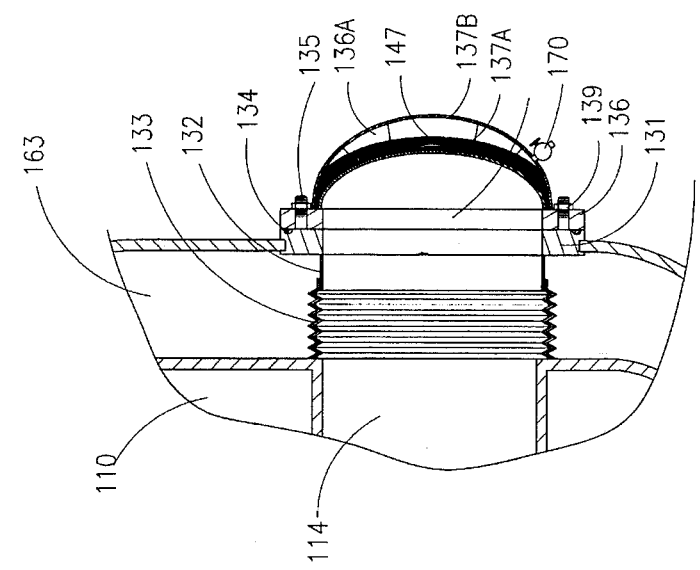
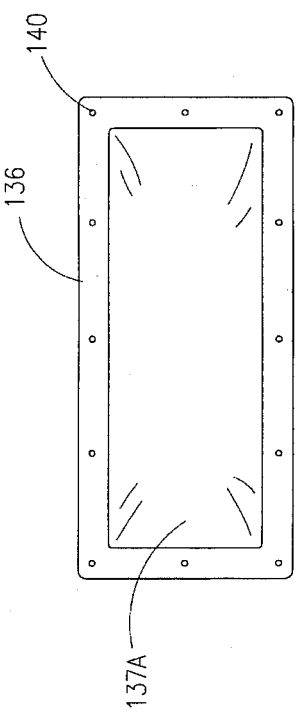
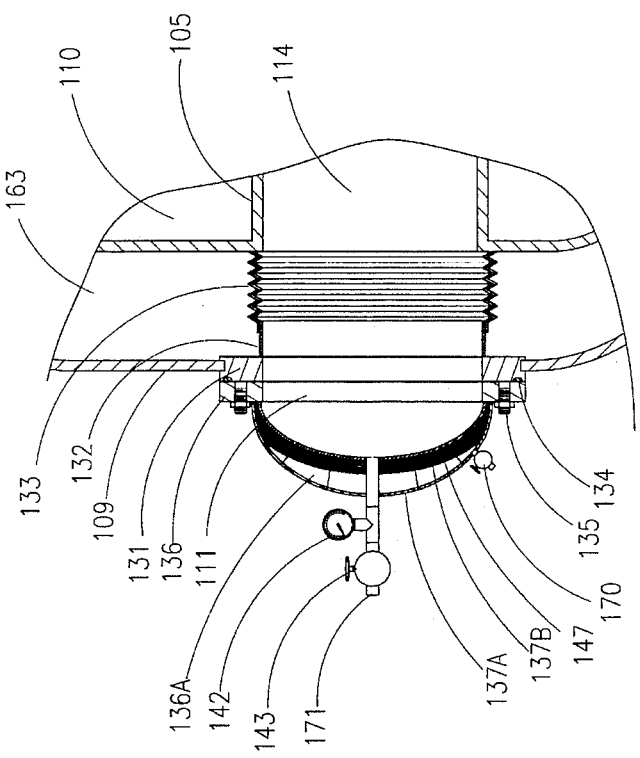

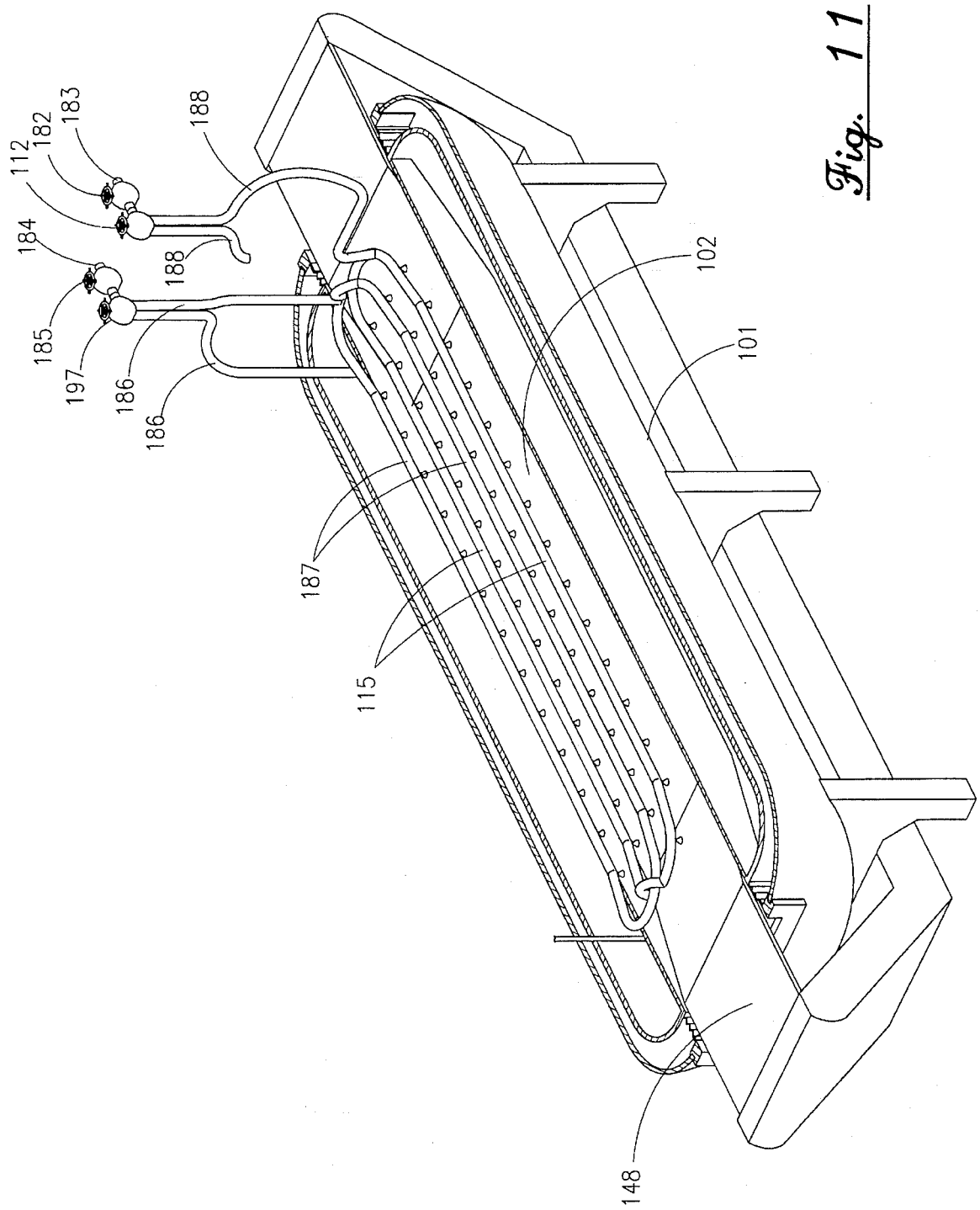

5,520,004

APPARATUS AND METHODS FOR CRYOGENIC TREATMENT OF MATERIALS

FIELD OF INVENTION

This invention relates generally to the field of cryogenic treatment of materials and, more particularly, pertains to apparatus and methods for the cryogenic treatment of materials creating states of frangibility for subsequent comminution and creating cryogenic- and low-temperature levels in food, organic, and other materials for enhanced qualities prior to and after standard frozen-storage procedures.

BACKGROUND OF THE INVENTION

Subjecting materials to cryogenic and low-temperature levels affect many characteristics of various materials. While other uses and applications described herein exist and may be obvious from this disclosure, the apparatus and methods described here are directed to the following areas:

(1) Short and long term preservation of the quality, nutritional value, and palatability of food products, by both low-temperature and freeze-vacuum methods.

(2) Creation of states of embrittlement or frangibility for rubber, plastics, metals, and other materials for subsequent processing to create fine-mesh particles, and (3) Separation of rubber or plastic base materials from other component parts, such as fibers and metals. For example, separation of rubber from used tires and conveyer belts.

As it relates to food products, the term "freezing" as used herein refers to the solidification or crystallization of water, moisture, and other fluid-like contents such as enzymatic and proteinaceous liquids by certain temperature- or heat-reduction methods prior to frozen storage. Freezing shall be sometimes referred to as ultrafreezing. Frozen storage refers to the holding of food and other products at constant sub-freezing temperatures. In the United States, frozen-storage temperatures are generally construed to be about 0° F. or lower. In Europe, frozen-storage temperatures are considered to be about −10° F. and lower.

The terms "cryogenic temperature", "cryogenic fluids" and "cryogenic coolants" are used in referring to temperatures, fluids and coolants below −250° F. and 1-atm pressure respectively and coolant temperatures of −250° F. or lower. "Low-temperature coolant" refers to those elements and compounds which exist in the liquid state at temperatures and pressures above −250° F. and 1-atm pressure respectively but are capable of freezing or embrittlement of the materials discussed at these higher temperatures.

Generally, liquid nitrogen ($LN_2$) is an excellent coolant for attaining cryogenic-temperature levels, but must be used efficiently to be cost effective. Liquid carbon-dioxide ($CO_2$) spray, forming dry-ice snow and $CO_2$ vapor at 1-atm pressure, is also used for freezing at −109° F. and higher, especially in food applications. $CO_2$, however, is a low-temperature coolant but not a cryogenic coolant since the minimum 1-atm temperatures attained (−109° F.) are greater than −250< F.

Many of the low-temperature or cryogenic-cooling or freezing methods are referred to as "IQF" freezing or "Instant Quick Freeze". This is somewhat of a misnomer since the implication is made that an item being treated is instantly reduced to the low-temperature or cryogenic-temperature levels. This may be the case for the extreme outer portions of the item but, as will be shown, the cooling or freezing times for the inner regions vary greatly depending on whether cryogenic-liquid, vapor-spray, or directional-cooling methods are used. Even with direct immersion of an item into a cryogenic fluid, such as $LN_2$, some time is required for the inner regions of the item to reach the low or cryogenic temperature.

Some semi-solid materials, such as rubber and thermal-plastic products, do not have freezing- or fusion-temperature points as do liquids but undergo certain crystalline changes and become brittle or frangible at certain low temperatures especially in the cryogenic-temperature range. Since similar materials within an item tend to contract away from junctions with other materials when cooled to low temperatures, separation of metals and fibers from rubber in, for example, automobile tires is performed more easily when the tire is cooled to cryogenic-temperature levels.

For freezing food products, rubber, plastic, or other materials, the most commonly used methods are vapor-blast or spray freezing, low-temperature or cryogenic-liquid spraying, immersion into low-temperature or cryogenic-fluids, or combinations of these procedures. Low-temperature or cryogenic vapors or fluids introduced into a negative-pressure chamber containing the materials to be subjected to sub-freezing-temperature levels of the respective coolants is another method used for attaining very low temperature levels. Negative pressure or vacuum techniques are used for freeze drying many food products. This consists of freezing the products followed by subliming or vaporizing aqueous fluids of the frozen portions in a vacuum to facilitate even longer storage times and reduced shipping weights.

Vapor-spray freezing generally entails subjecting articles or products to vapors emanating from perforated tubing above the products as they are conveyed through a tunnel-like apparatus. This practice is widespread and used commercially to freeze food for long-term frozen storage and to embrittle rubber, plastics, and other products. Generally, the tunnel-vapor process utilizes vapors and carbon-dioxide snow emanating from liquid carbon dioxide ($LCO_2$) or liquid-nitrogen ($LN_2$) storage tanks through transfer lines to perforated tubing running along the tops, sides and/or bottoms of insulated tunnels. The vapors may be further circulated for more efficient cooling by fans situated at the ends or inside of the tunnels. Expended vapors may also be used for pre-freeze cooling of the products prior to entering the tunnel. Many tunnel systems utilize urethane or styrofoam insulation around the tunnel walls which allows greater coolant losses than would be incurred by other methods of insulation.

Vapor-blast or spray methods may also be used in conjunction with liquid-spray application as the product is conveyed along the length of the tunnel. This ensures more rapid formation of frozen crusts around the outer area of the products if used at the entry portion of the tunnel and more thorough freezing of the product if used near the exit end of the tunnel.

The liquid spray of $LN_2$ has greater heat-absorption capabilities than the vapor spray. Liquid-spray procedures may also be used along the entire length of the tunnel if fracturing, rupturing or breakage pose no difficulties such as when treating rubber and plastic for embrittlement or for separation of rubber from metal or rubber from fiber materials. Fracturing, rupturing, or breakage may occur on food or other materials when freezing too rapidly occurs on the outside of the articles due to the different expansion/contraction rates of the frozen outer crusts and unfrozen or warmer inner portions of the products.

In conjunction with or separate from the vapor-spray and/or liquid-spray tunnel methods, some freezing techniques employ liquid-immersion steps or mechanical refrigeration techniques utilizing such coolants as brine or sodium chloride solutions. Liquid-nitrogen immersion may also be performed on food products to attain partial freezing or ice crusts prior to entering the vapor-spray or liquid-spray section of the tunnel to complete the freezing process at lower temperatures prior to frozen storage. Higher-than-cryogenic-temperatures utilizing liquid $CO_2$ as the immersion medium is used in some commercial methods.

Some frozen storage facilities may be also be used for freezing chambers. This generally entails expensive insulation costs. The applicant has observed one facility where crawfish and blue crab were placed, after being cooked and chilled to 35° F., into a storage facility maintained at −5° F. by mechanical refrigeration prior to being filled with the boxed products. Carbon-dioxide vapor and dry-ice snow were then sprayed from tubes around the top of the freezing room until the temperature of the highest portion of the stacked products reached −40° F. over a period of about 6 hours. After a holding time of about 20 hours, the equilibrium temperature reached −10° F. or colder, at which time the boxed products were loaded into and shipped in frozen-storage containers maintained at below −10° F. Although described by the operator as such, this procedure does not suffice for long-term frozen storage (6 months or more) because of the relatively high pre-storage freezing temperatures and relatively slow freezing rates used.

Another commercial method commonly used is referred to as the spiral or spiral-belt freezing system. This consists generally of a spiral conveyor-belt system running from the bottom, around, and through the top of a vertical, insulated chamber. Liquid nitrogen or carbon-dioxide vapor or dry-ice snow is injected into the top or bottom of the chamber until desired temperature levels are attained. This system requires less space than the previously mentioned tunnel systems which generally are 20 to 60 feet in length or even longer in some large-volume operations.

Still another freezing technique for food products is that of the freeze-plate or contact method. This consists of placing the products onto and between horizontal plates or adjacent to vertical plates. Refrigerants are circulated through channels inside the plates while some pressure is maintained on the products to sustain close contact between the product and the plates. This method again primarily utilizes commercial refrigerants such as brine, but longer freezing times are required than for the previously discussed procedures.

Most of the freezing procedures described generally involve isothermal freezing or heat absorption, especially in the tunnel and the spiral systems, or long freezing times as in the plate-or contact-freezing procedures. In the tunnel-freezing methods, which are becoming more prevalent both for food products and for embrittlement or rubber, plastic, metal, and other materials only a relatively small percentage of the vapor or liquid spray is in contact with the surface area of the product. This requires large amounts of coolant especially for rapid-temperature reduction. Greater amounts of coolant, which is not fully utilized, are also required for attaining ultimate low temperatures of the product which, if used efficiently, would be that of the coolant. The tunnel volume must also be sufficiently large to accommodate maximum product volume. Since the tunnel volume must essentially be inundated with vapor or liquid spray, less-than-maximum product amounts are frozen less efficiently. Some processing facilities store products until sufficiently large volumes are available for efficient freezing operations. This can be very detrimental to the quality of the frozen product, especially for such products as blue crab or crawfish, since both have rapid deterioration rates if not rapidly frozen to low-temperature levels.

As discussed earlier, freezing or cooling too rapidly, which can be done by immersion freezing or injecting large amounts of vapor or liquid spray, may also result in fracturing, rupturing, or breakage of many food products because the freezing temperatures for the outer portion are colder than those of the inner portion resulting in large internal stresses which can ruin the product. This can be overcome by initially forming frozen crusts or allowing only a certain portion of the product to freeze; the remaining portion of the product is therefore frozen at higher temperatures as equilibrium temperatures between that of the colder crusts and that of the higher-temperature inner portions are attained. This technique is being used with some success, but, obviously, product size variations may require various crust formation times as well as temperature equilibration times.

The problems just described for some food products are desirous for materials such as rubber, plastics, and other non-food products which are frozen for embrittlement or frangibility purposes prior to subsequent comminution. However, immersion freezing does not lend itself to viable conveyor methods. Conveying rubber through a liquid coolant is a tedious procedure. The expense of tunnel injection of large amounts of vapor or spray onto reclamation products, for example, rubber from used automobile and truck tires, generally low-cost materials, can be cost prohibitive if efficient methods are not used. Also, sufficient quantities of product must be at hand to fully optimize large-volume tunnel designs.

Bacterial growth may also result from damage created by large-crystal formation when freezing food products. Bacteria counts are generally higher for items which have been frozen at higher freezing temperatures with lower temperature-reduction rates, and bacteria are more easily propagated because of cell-wall damage by slower freezing rates of saline and enzymatic fluids within some food products.

As freezing temperatures are reduced below 32° F., for many seafood and meat products and crustaceans, such as crawfish and blue crab, purer water in the tissues freezes out into large ice crystals if slow temperature-reduction rates are used. The remaining salt and enzymatic fluids may not freeze until temperature levels below 0° F. are attained. These salts and enzymes are highly corrosive to meat-and fat-cell walls, and the formation of large frozen ice crystals may further damage cell walls. Textural damage and reduced palatability may be significant due to these factors.

Generally, for all food products except those that are freeze dried, drip loss or loss of product fluids or juices is another factor that can be correlated to large-cell ice crystal formation during freezing. This is a factor that is measured routinely on commercial products that are frozen and stored for long periods. Generally, drip losses in non-acceptable levels are observed for those products which have been frozen at warmer temperatures and/or slower rates prior to long-term frozen storage. For these reasons, low temperatures should be attained as quickly as possible. Frozen-storage temperatures should also be as low as economically feasible, preferably −10° F. or lower, to minimize activity of enzymatic and other fluids. Generally, the higher the water, fat, and enzyme content, the more critical the attainment of low-temperature freezing levels preferably to below −250° F. or cryogenic levels, and maintenance of low frozen-storage temperatures, preferably −10° F. and below.

OBJECTS OF THE INVENTION

It is not an intent of the present invention to provide new and innovative methods of preparing food products such as blanching or cooking processes prior to ultrafreezing for long-term storage (6 months to several years); nor is it an objective to provide new and innovative methods for crushing, grinding, or separation procedures for non-food materials such as rubber, metals, or plastic products or combinations thereof after ultrafreezing to create states of embrittlement for fine-mesh production and to facilitate easier separation of product contents.

It is a general intent of the present invention to provide a new, improved, and more efficient apparatus and methods for freezing food products prior to long-term frozen storage as well as to facilitate long-term storage and shipping of food products.

It is another general intent to provide new, improved, and more efficient methods for subjecting non-food materials such as rubber, plastic, metals, and other materials to cryogenic-temperature or low-temperature levels for creation of states of embrittlement or frangibility to facilitate their reduction to fine-mesh particles by subsequent processing and to facilitate the separation of components parts of such products.

The general goal of the invention is to provide an apparatus and methods for freezing food and non-food items to cryogenic-temperature and low-temperature levels more efficiently than known processes by more effective utilization of latent heats of vaporization and specific-heat capacity of liquids and vapors respectively.

One object of the invention is to provide an apparatus and methods utilizing essentially the latent heat of vaporization of cryogenic temperature or low-temperature fluids to freeze materials to desired low temperatures creating lower-temperature vapors available for additional cooling, and to do so without immersion of the materials directly into the cryogenic-or low-temperature liquid coolant.

Another object of this invention is to provide an apparatus and method for freezing food products to essentially the temperature of the cryogenic fluid or low-temperature coolant used in the apparatus resulting in small ice-cell formation.

Another object of the invention is to provide an apparatus and methods to create more rapid freezing of food and other products to cryogenic-temperature or low-temperature levels to further contribute to small ice-cell formation.

Still another object of the invention is to provide an apparatus and method for freezing food and other products to cryogenic-temperature or low-temperature levels without fracturing, rupturing, or breakage of the products.

Another object of the invention is to provide an apparatus and method for rapidly solidifying or freezing saline, enzymatic, and other fluids of food and other organic products to minimize corrosive and sharp-edge crystal damage to meat-cell, fat-cell, and other tissue walls of the products.

Another object of the invention is to provide an apparatus and method for rapidly freezing food and other products to cryogenic-temperature or low-temperature levels followed by vacuum dehydration or low-pressure sublimation of the frozen ice cells.

Another object of the invention is to provide an apparatus and method for freezing food and non-food products to below the STP freezing points of the cryogenic-temperature or low-temperature coolant used in the apparatus.

Another object of the invention is to provide an apparatus and methods to subject rubber, plastic, metal, and other materials to cryogenic-temperature or low-temperature levels for creation of states of embrittlement or frangibility to facilitate production of fine-mesh or smaller-size particles.

Another object of the invention is to provide an apparatus and method to subject rubber, plastic, metal, and other materials to cryogenic-temperature or low-temperature levels to facilitate separation of base materials from component parts.

Another object of the invention is to minimize the cryogenic- or low- temperature coolant quantities required for cooling or freezing to low-temperature levels for subsequent fine-mesh processing of frangiated materials or long-term food or organic-materials frozen storage.

Another object is to minimize the loss of coolant fluids in recooling the freezing space (tunnel) and contiguous components after non-use periods and to minimize or eliminate the need for expensive coolant-storage stations.

BRIEF DESCRIPTION OF THE DRAWINGS

FIG. 8 is a side cross-sectional view of a detachable door showing tunnel evacuation valve.

FIG. 9 is a side cross-sectional view of a detachable door without the tunnel evacuation valve.

FIG. 10 is a rear view of the door in FIG. 9 showing the door flange.

FIG. 11 is an isometric cut-a-way view of the first horizontal embodiment showing the dispersion tube layout.

DESCRIPTION OF THE TEST EMBODIMENT

Figure 1:
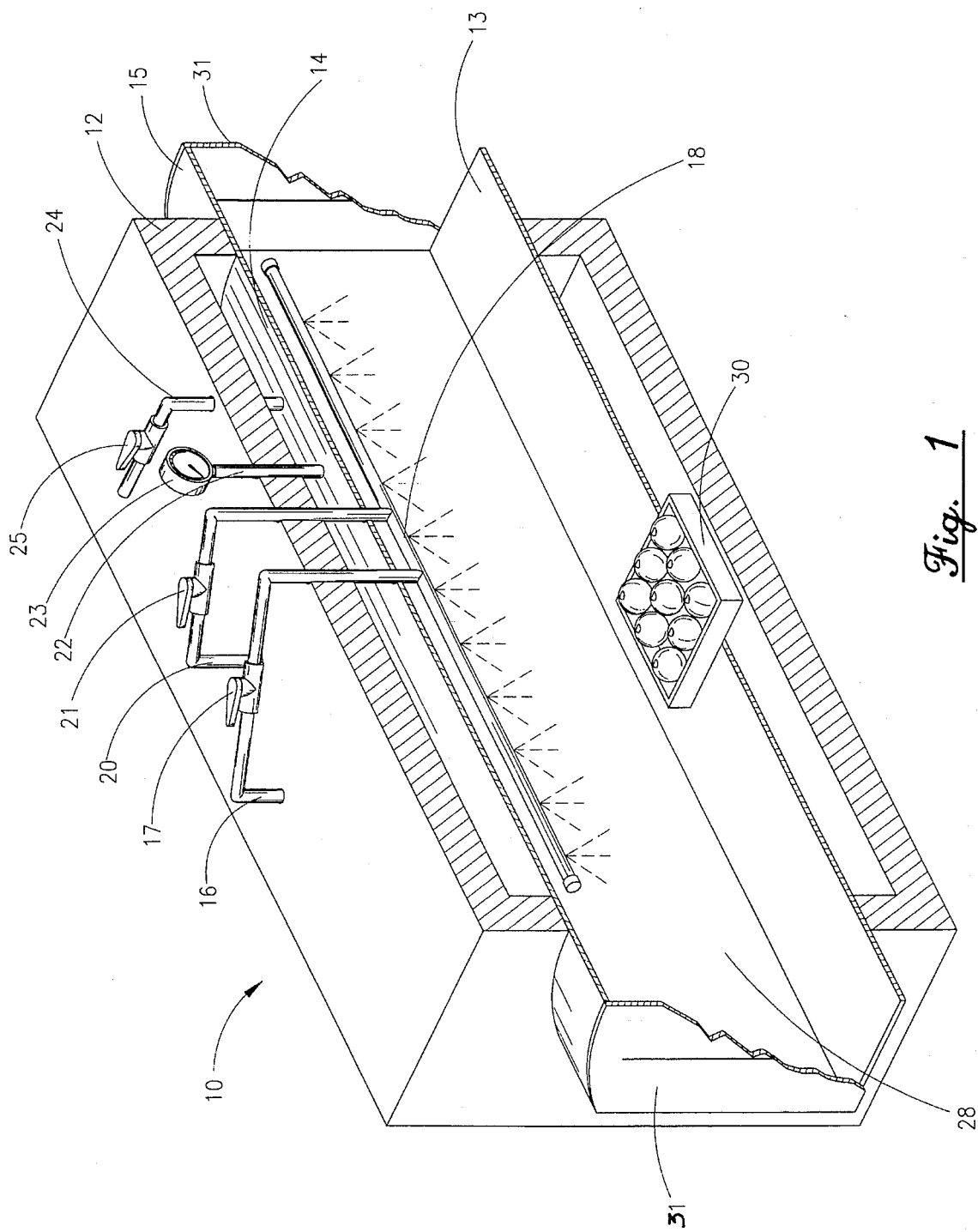
FIG. 1 is an isometric sectional view of the test embodiment.
Figure 2:
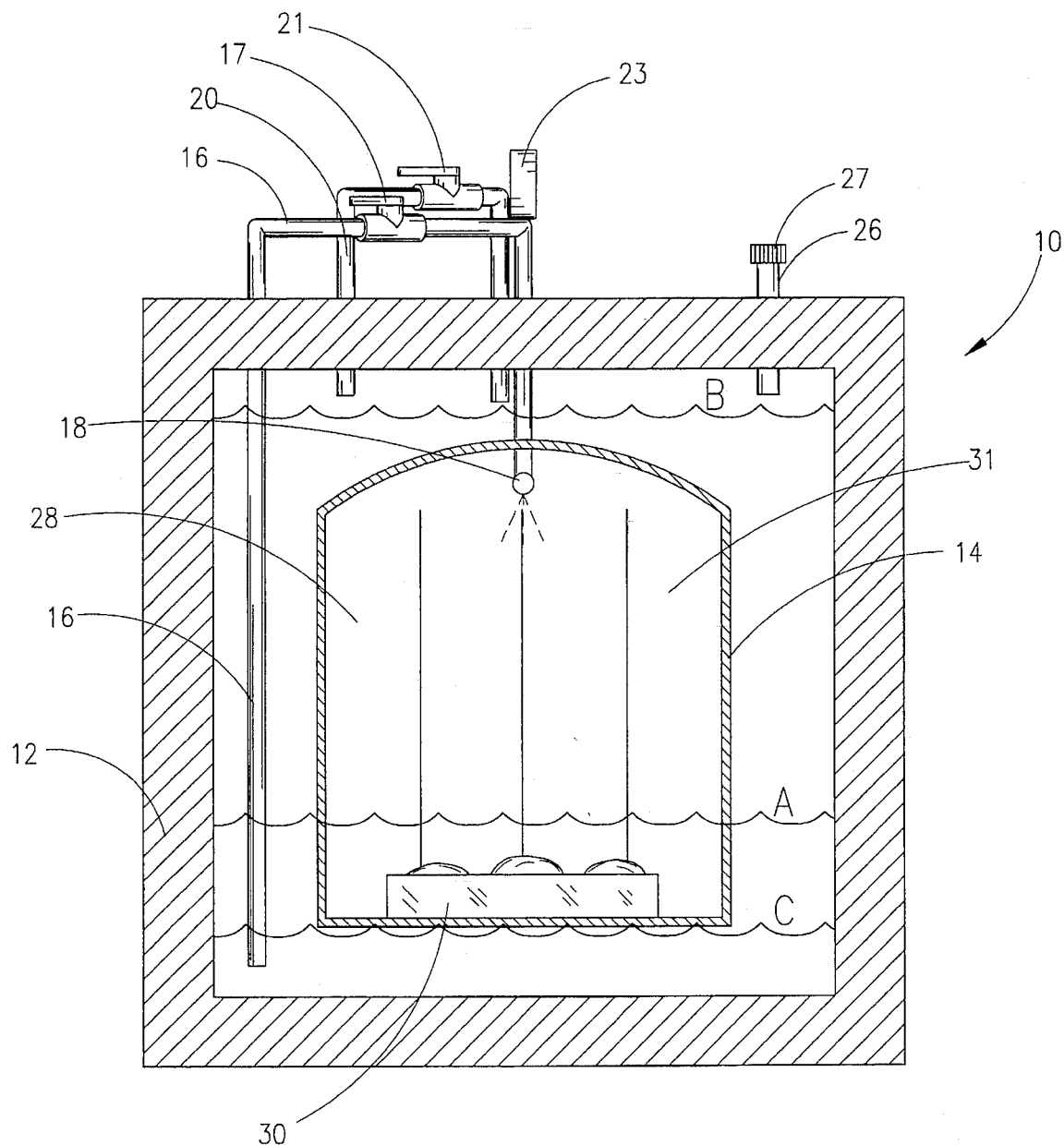
FIG. 2 is a cross-sectional view of the test embodiment.
Figure 3:
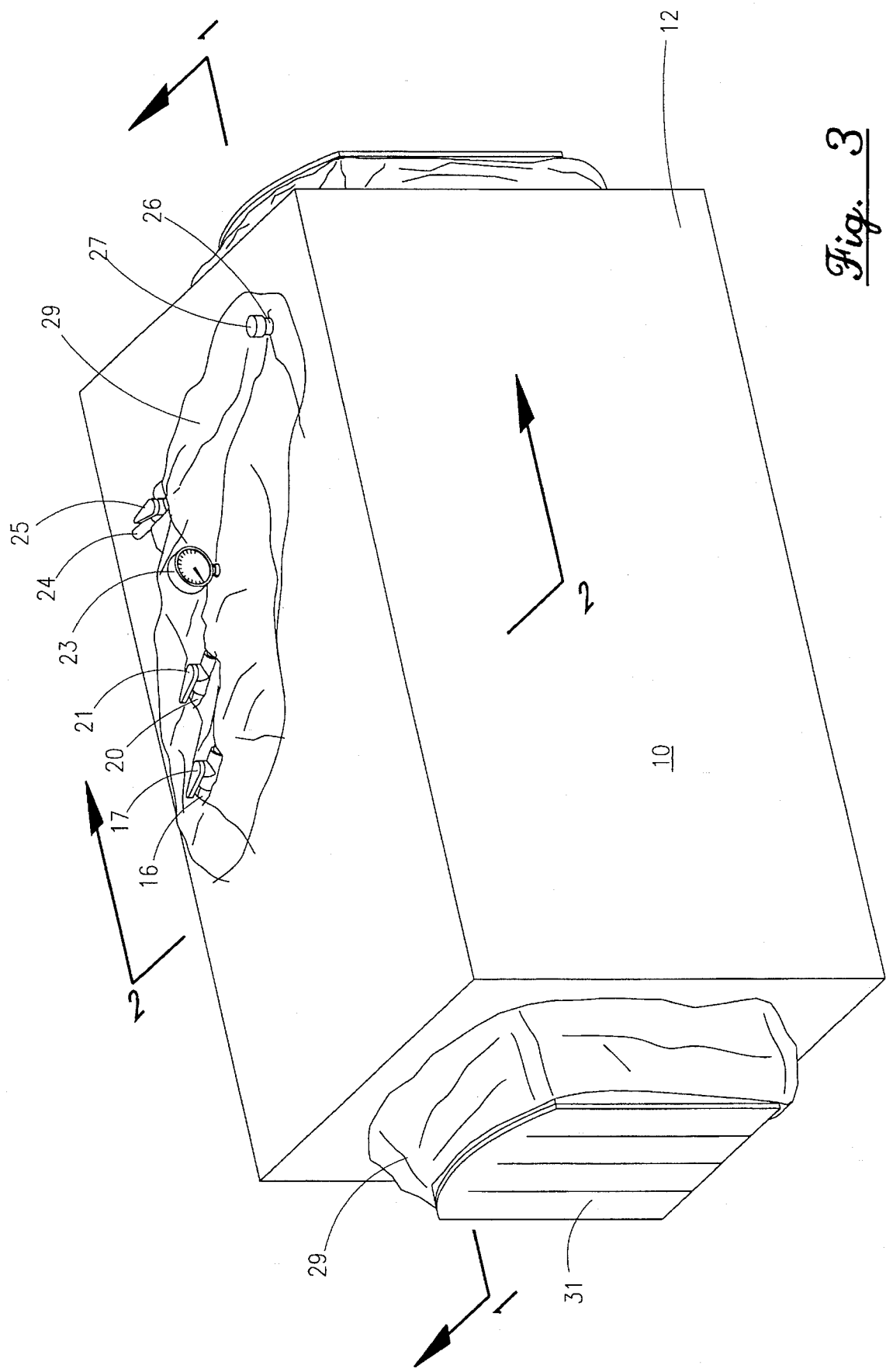
FIG. 3 is an isometric external view of the test embodiment.

FIG. 1 illustrates a cross-sectional side view; FIG. 2 illustrates a cross-sectional front view; and FIG. 3 illustrates an external isometric view of the freezing apparatus comprising the first test embodiment of the present invention. This embodiment was constructed to simulate an apparatus to facilitate entry and egress to and from a freezing space to allow conveyor operations to be addressed in a subsequent design.

The apparatus (10) comprises a rectangular container (12) and inner tunnel portion (14). The rectangular container (12) was fabricated of 2-inch thick medium-density poly-styrofoam to create its bottom, sides, ends and top. 6061 aluminum, 0.125-inch thick, was formed to create the tunnel portion (14) of the apparatus (10). Openings were cut into the ends of the container (12) through which the tunnel (14) was inserted. The inner rectangular dimensions of the apparatus (10) were 3 feet in length, 1.5 feet in width, and 1.5 feet in height. The dimensions of the aluminum tunnel (14) were 4 feet, 4 inches in length, 1 foot in width, with 1-foot sides. The tunnel (14) was comprised of a flat-bottom plate (13) and a domed top (15). The tunnel height from the bottom (13) to the top of the dome (15) was 14 inches. The space between the poly-styrofoam container (12) and aluminum tunnel (14) was sealed with low-temperature urethane glue. Each end of the tunnel (14) extended 4 inches beyond the outer walls of each end of the container (12) and was insulated with 2 inches of expanded polyurethane (29). Flexible polyethylene sheets (31) 0.25-inch thick, were used to cover, but not seal, each end of the tunnel to reduce entry of outside air and heat into the tunnel to allow longer retention times for any coolant vapors used for cooling in the freezing space. The sheets (31) were slit into 3-in. widths to facilitate product entry and temperature-sensor insertion for temperature-time measurements.

A 0.375-inch I.D., Type 316 stainless-steel tube (16) runs from the bottom of the container (12), along one side between the container (12) and the tunnel (14), up through the styrofoam container top to valve (17) and back through the top of the outer container and top of the tunnel (14) to dispersion-tube (18). The dispersion tube (18) was Type 316, 0.375-inch I.D. stainless-steel tubing, 2 feet, ¾-inch in length. The dispersion tube (18) was perforated at 1-inch intervals with $\frac{1}{32}$-inch holes and extended to within 0.125 inch from the inner walls of the ends of the tunnel (14). The bottom of the dispersion tube (18) was situated 13 inches above the bottom plate of the tunnel. The ends of the tube (18) were sealed with screw caps. Tubing connections were made using industrial-grade low-temperature epoxy.

Another section of 0.375-inch I.D. stainless-steel tube (20) runs from just below and through the top of the container (12), through valve (21), and back through the tops of the outer container (12) and tunnel (14) to dispersion-tube (18).

An additional, 0.375-inch I.D. stainless-steel tube (22) extends from just below the bottom of the top of the polystyrofoam container (12) to pressure-gauge (23). An exhaust vent (24) also of 0.375 inch I.D. 316 stainless steel extends to the open ambient from valve (25). A fill-port (26) of 0.5-inch I.D. 316 stainless steel extends through the top of the container (12). The fill-port (26) may be opened to allow entry of liquid nitrogen which was the coolant used in the first tests, or closed by seal-cap (27). The liquid coolant is obtained from an external coolant source, which will be a commercially available liquid coolant storage tank. The bottom portions of all tubing extending upward from the top of the container (12), as well as the bodies of valves (17), (21), and (25), were insulated with approximately 2 inches of expanded polyurethane (29).

Several methods were employed in evaluating the embodiment of the invention illustrated by FIGS. 1 and 2. In the various evaluation and test modes, all temperature measurements were made with a silicon-diode temperature sensor connected to a digital indicator (not shown) measuring in degrees Kelvin. The sensor is contained in a cylindrical capsule of $\frac{1}{16}$-inch diameter and $\frac{3}{16}$-inch length such that 100% contact uniformity with a flat surface such as the flat bottom plate (13) or with the dome top (15) of the tunnel is not made because of the radius of the capsule; in such measurements, the readout measurements are estimated to be 0.51–1.0 K.° warmer than the actual temperatures. When the sensor is encompassed by the ambient to be measured, as such as liquid nitrogen or nitrogen vapor, the lag times are estimated to be about 5 seconds and 30 seconds respectively; warmer temperatures and/or lower coolant mass per unit volume, such as nitrogen vapor or air, require greater response times as well as longer equilibration times for the sensor than required for a greater-density, lower-temperature liquid coolant.

The polyethylene covers (31), shown in FIG. 3, were closed as securely as possible, but not sealed, around the ends of the tunnel (14). The lead-wire connections of the temperature sensor were contained in ⅜-inch diameter low-thermal-conductivity tubing to minimize measurement variations due to air movement and heat convection. All temperature measurements were made within the center 2 feet of tunnel (14) within the apparatus (10). The liquid-nitrogen level was maintained using a flat styrofoam float (not shown) situated on the surface of the liquid and connected to a light-weight balsam-wood rod extending through fill-port (26) to allow liquid-level determination when the screw-cap (27) was removed.

TEST METHODS

The coolant used in the initial test procedures was liquid nitrogen, but it is stressed that any number of cryogenic or low-temperature coolants may be used in the methods encompassed by the present invention. Liquid nitrogen, however, is of relatively low cost and readily available and has many desired thermal characteristics conducive to attaining the objects of the invention. Liquid $CO_2$ also has certain desired characteristics, even though not a cryogenic coolant at 1-atm pressures, and will be discussed on a more limited basis within the scope of the present invention.

The apparatus described by FIGS. 1, 2 and 3 was used to evaluate several ultrafreeze methods by utilizing primarily three liquid-nitrogen containment modes referred to respectively as Modes I, II, and III. Other use options such as high pressure (above 19 psia) and low-pressure (vacuum) freezing methods will be made obvious, but were not thoroughly tested using the described first embodiment because of strength limitations of materials used in constructing the apparatus (10). However, these methods will be discussed in the description of the preferred embodiments.

In Mode I, the apparatus (10) is filled through fill-port (26), after opening seal-cap (27), with liquid nitrogen to level A as indicated in FIG. 1. Valves (17) and (21) are closed and valve (25) opened to prevent pressure buildup in the space between the tunnel and styrofoam walls and top of the container until the product is placed into the freezing space (28). Level A indicates a liquid nitrogen level in the containment space of 2.0–2.5 inches above the bottom plate (13) of the tunnel (14).

In Mode II, the apparatus (10) is filled with liquid nitrogen to level B, as indicated in FIGS. 1 and 2, completely encompassing the tunnel (14) to about 2.0–2.5 inches above the domed top (15) of the tunnel (14). Again, valves (17) and (21) are closed and valve (25) opened to prevent pressure buildup until the product is placed into the freezing space (28).

In Mode III, the apparatus (10) is filled with liquid nitrogen to level C, indicated in FIG. 2. Valves (17) and (21) are closed and valve (25) opened to prevent pressure buildup until the product is placed into the freezing space (28). Level C is about 1.0 to 1.5 inches below the bottom plate (13) of the tunnel (14).

It is to be noted that in Modes I, II, and III, the primary cooling method is that of conduction which occurs when the product (30) is placed onto the bottom plate (13) in the middle of the center 2 feet of the freezing space (28) of the tunnel (14) and utilizes essentially the latent heat of vaporization of liquid nitrogen for cooling.

In Methods I and II, the bottom of the product (30) is in direct contact with the bottom plate (13) which in turn is in direct contact with the liquid nitrogen. In Method III, the product (30) is also in direct contact with the bottom plate (13), but the bottom plate (13) is in contact with the saturated vapor emanating from the surface of the liquid nitrogen at level C below the bottom plate (13). The plate (13), therefore, is in indirect communication with the liquid nitrogen.

It is also to be noted that in all of the subsequent test procedures, the primary cooling or freezing mode is of conduction via the bottom plate (13). Secondary cooling modes may be of convection from air within the tunnel (14), $N_2$ vapor from dispersion-tube (18), and $N_2$ liquid from dispersion-tube (18). Radiation cooling from the tunnel side walls and top also occurs.

It is also obvious that the cooling and freezing modes are primarily directional—from the bottom to the top of the product—since the bottom of the product (30) is in contact with the liquid nitrogen via the bottom plate (13) in Modes I and II or in communication with the liquid nitrogen via the plate (13) and the saturated vapor above the liquid nitrogen surface C in Mode III.

It is to be noted also that in each of the containment modes I, II, and III, liquid nitrogen or vapor may be sprayed onto the product (30) by allowing pressure buildup within the space above the liquid nitrogen level A, B, or C. This is accomplished by closing all valves and the fill-port (26) and allowing the pressure to build to about 16.5–19.0 psia. At this time, either Valve (17) or (21) is opened and $LN_2$ or $N_2$ vapor is sprayed onto the product (30) via dispersion-tube (18). As $N_2$ vapor is sprayed onto the product (30), the pressure within the apparatus (10) is reduced essentially to that generated due the heat absorbed through the walls and ends of the tunnel (14) from the external atmosphere as the product (30) is cooled to temperatures approaching that of the $LN_2$. When $LN_2$ is sprayed onto the product (30) via the dispersion tube (18), the $LN_2$ spray rate is also dependent on the ambient heat absorbed by the apparatus (10) plus that absorbed from the product (30).

Essentially directional or non-isothermal freezing occurs in all of the test procedures utilized using Modes I, II, and III although to a lesser extent when liquid spray through the dispersion tube (18) is used. In that case colder $LN_2$ strikes the top and sides of the product (30) and cooling is more nearly of an isothermal nature at least on the outer portions of the product.

These modes entail nearly direct utilization of the latent heat of vaporization of the liquid coolant since the heat loss of the product (30) occurs mostly by conduction, via the bottom plate (13), to the liquid coolant in Modes I and II, and to a lesser extent via the bottom plate (13) and saturated vapor in Mode III. Also, the heat of vaporization of the coolant liquid is more fully utilized without incurring transmission heat loss as in a vapor- or liquid-spray system when nitrogen vapor or spray is provided via an external storage tank as in many existing commercial systems. Thus, almost all of the liquid's latent heat of vaporization is available for cooling and freezing. The 1-atm latent heat of vaporization of liquid nitrogen, for example, is 199.3 KJ/Kg (84.3 BTU/lb) and represents the cooling potential of 1-atm nitrogen used only in converting 1 Kg of $LN_2$ from the liquid to the vapor state at 77.3 K. (–320° F.). The converted low-temperature vapor, very nearly the same temperature as that of the 1-atm $LN_2$, is available for subsequent cooling either inside the cooling space 28 of the apparatus or it may be directed to other cooling regions external to the apparatus. Most commercial systems waste this cooling potential by utilizing vapors created within storage systems prior to the vapors entering the freeze tunnel without taking advantage of the liquid coolant's available heat of vaporization.

Various freeze methods are available utilizing containment Modes I, II, and III. The respective procedures are referred to alphabetically for each liquid-nitrogen containment mode. Temperature measurements and product tests were made after allowing five minute stabilization time for each mode, i.e., to allow initial nitrogen boiling to subside and temperature equilibrium to be attained inside the freeze space (28) of the apparatus (10). All measurements and tests were made with the polyethylene flaps (31) at each end of the tunnel closed except where the temperature sensor was inserted through the center slit of the cover. Results are discussed after the procedures are summarized.

Method IA—In this procedure, valves (17), (21) and (25) are closed and fill-port (26) opened to allow nitrogen vapors to exit the tunnel during and after filling with liquid nitrogen to level A (2.0 to 2.5 inches above the bottom plate). After five minutes, the bottom plate (13) temperature measures about 78 K. (–319° F.) at which time product (30) is placed onto the 78-K bottom plate in the center of the cooling space (28). Freezing commences immediately on the product surface in contact with the bottom plate (13) and continues directionally in an upwards direction to the top of the product (30).

In this method, the primary freeze mode is of conduction, via the bottom plate (13); convection, via the residual air inside the tunnel; radiation-heat loss by the product (30) to the bottom portion of the tunnel (13) contiguous to the liquid nitrogen and the side walls and top of the tunnel (14) contiguous to the 1-atm vapor emanating from the liquid nitrogen. No nitrogen vapor or $N_2$ spray is allowed to contact the product (30) as the $LN_2$ undergoes liquid-vapor conversion by heat absorption from the product (30) and the converted vapors are exited via fill-port (26).

Method IB—This method entails similar fill procedures as IA, but when the product is placed into the freeze space (28), valve (21) is opened such that the vapors created by the $LN_2$ heat absorption from the external atmosphere and from product 30 are forced through tube (20) to exit via dispersion tube (18) onto the product (30). When the product (30) is first placed into cooling space (28) of the tunnel (14), the initial vapor velocity is high, but diminishes as the product (30) is chilled to more nearly the temperature of the $LN_2$ coolant. The freezing modes are, therefore, primarily by conduction via the 78-K bottom plate (13) and nitrogen vapors via dispersion-tube (18) in addition to the radiation/convection modes discussed in Method IA.

Method IC—The procedures are similar to IB, but valve (7) remains closed, and valve (17) is opened. In this case, liquid-nitrogen spray exits dispersion-tube (18) onto the product (30). The $LN_2$ is forced through tube 16 by the pressure above the $LN_2$ level generated both by heat absorption of the apparatus (10) from the external atmosphere and the heat absorbed from product (30). The initial $LN_2$-spray velocity is high, but again drops gradually as heat is absorbed from product (30). The initial pressure was not allowed to exceed 1.1 atm by exiting excess vapor through vent (24) by opening valve (25), which would have been the case had valve (25) not been used to prevent excessive pressure buildup. So the primary freeze modes are again of 79 K.(–317° F.) (slightly-higher pressure $LN_2$ temperature), conduction via the bottom plate (13) and of $LN_2$ spray onto the product (30) in addition to the radiation/convection modes discussed earlier.

Methods ID—This procedure is similar to IA, i.e., essentially freezing occurs primarily by conduction via the bottom plate (13), but at a higher pressure of 1.3 atm (≈19 psia) which creates a warmer $LN_2$-coolant temperature, ≈81 K. (≈314° F.). Valve (25) is opened intermittently to maintain (19) psia and no $LN_2$ or nitrogen vapor is dispersed onto the product (30).

Method IE—Here, the freeze procedure is similar to Method IB, but with warmer-temperature bottom-plate (13) cooling at 1.3 atm(≈81 K.) (–314° F.) and higher-velocity nitrogen vapor directed toward the top of the product (30) via dispersion-tube (18). Again, valve (25) is opened intermittently such that a 1.3-atm pressure (19 psia) is not exceeded.

Method IF—The procedure in this case is similar to 1C, but with warmer bottom-plate (13) temperatures (81 K.) (–314° F.) at 1.3-atm pressure and higher-velocity $LN_2$ sprayed onto the product (30) via dispersion-tube (18).

Method IG—In this case, all valves and fill-port (8) are closed, and exhaust-vent (24) is connected to a mechanical vacuum pump. Valve (25) is then opened gradually until a pressure of 0.7 atm (10.3 psia) is reached. The bottom-plate (13) temperature contiguous to the lower pressure nitrogen reaches ≈74 K. (–326° F.) after about five minutes at which time product (30) is placed into the freeze space (28). This method is used to demonstrate the viability of freezing at temperatures below the 1-atm boiling temperature of the $LN_2$ coolant. However, because of the lower temperature of the sides and top (15) of the tunnel (14) around the freezing space (28) than the 1-atm liquification temperature of the eternal air ambient, some air is liquified on the inside of the tunnel (14) in the freeze space (28). Also some freezing of condensate from the air occurs since the walls of the tunnel (14) begin to act as a pump drawing in air and moisture from the external atmosphere since the temperature of tunnel 14 is lower than the corresponding vapor-pressure temperature of the external-air ambient. This method is demonstrated primarily to show the viability of negative-pressure cooling and will be discussed in more detail in a subsequent preferred-embodiment discussion and design of the present invention.

For containment Mode II, all of the 7 procedures—A through G—were used. However, it is to be noted that greater radiant-heat absorption from the product by the tunnel top (15) and side walls of the tunnel (14) occurs because the sides and domed top are contiguous to the liquid nitrogen and are, therefore, colder. Also the nitrogen vapor transmitted through tube (20), as in steps IB and IE, are colder since the vapors have greater contiguity to the $LN_2$ which totally encompasses the tunnel (14). The $LN_2$ spray is also transmitted more effectively through tube (16), as in steps IC since the transmission path through the $LN_2$ is at a lower temperature, and the $LN_2$ is at a higher fill level than in Containment Mode I. In addition to the greater radiant-heat absorption, more convectional cooling occurs by residual air inside the tunnel (14) because of the greater inside surface area of the tunnel contiguous to the liquid nitrogen.

Containment Mode III, with the $LN_2$ level 1.0–1.5 inches below the bottom plate (13), is the least desirable of the containment modes. However, it is presented to demonstrate another technique for freezing at warmer bottom-plate (13) temperatures than higher-pressure $LN_2$ contiguous to the bottom plate (13). The lower-level liquid nitrogen necessitates more frequent filling of the containment space than required in either Mode I or II. Also, since the thermal conductivity of the vapor (7.23 mW/m-K@77.4 K.) is much less than that of the $LN_2$ (139.6 mW/m-K@77.4 K.), longer cooling times of the product (30) via the bottom plate (13) to vapor to liquid are required. It is possible that some food products may require warmer bottom-plate temperatures, especially some with very high moisture or liquid content or extremely fragile tissue- or meat-cell walls.

Methods A through G are available for freezing using Containment Mode III, but only IIIA was used for test purposes, i.e., 1-atm $LN_2$ bottom-plate cooling with no $LN_2$ or vapor spray directed onto product (30) via dispersion-tube (18). About 20-minutes time was required, after $LN_2$ filling to 1.0–1.5 inches below the bottom plate (13), for the temperature of plate (13) to reach 91 K. (–297° F.) at which point product (30) is placed into the freeze space (28). It is also to be noted that less convectional cooling and radiant-heat loss to the tunnel walls occur because of the warmer temperature of the bottom plate (13), side walls, and top (15) of the tunnel (14).

Henceforth, the individual freezing procedures shall be referred to by I, II or III followed by the letter A through G designating the respective $LN_2$-containment mode and cooling method. For example Method IIA describes Containment Mode II, with 1-atm $LN_2$ totally encompassing the tunnel (level B, indicated in FIGS. 2) and no $LN_2$ spray or vapor contacting the product (30) via dispersion-tube (18) described by Method B and C respectively.

Various food products have been ultrafrozen prior to long-term frozen storage, but results for only three are reported in detail. These are cooked or blanched whole crawfish, sizes of 1 to 1-½ oz. each; cooked or blanched whole Gulf coast blue crab, sizes of 10 to 15 oz. each; and ripe tomatoes, sizes 4 to 6 oz. each. These items were selected for initial tests because of their susceptibility to breakage if too rapid isothermal freeze procedures are used, loss of palatability and texture if not properly frozen, and bacteria propagation during frozen storage if proper pre-storage freezing methods are not used, especially in the crawfish and blue crabs. Cooling time versus temperature testing was conducted for rubber samples with the sensor placed into the top portion of a bottom layer of 2-by 3-in. sections of rubber sidewall material which was frozen in two-layer quantities. Subsequent temperature-time measurements were made for the top of the uppermost layer.

To determine cooling times vs. temperature for the crawfish, the temperature sensor was first placed through the shell and into the center of the anterior portion of the tail-meat section of a larger crawfish (1-½ oz.) for which temperature measurements at various time intervals were made. This was repeated except that the sensor was then placed into the uppermost portion of the anterior section of the crawfish for temperature-time measurements.

A similar procedure was used for the larger-size crabs (15 oz.) except that the sensor was placed into the center and later into the uppermost portion, respectively, of the anterior meaty section of the blue-crab bodies from which lump crab meat is obtained.

For the tomatoes, the sensor was placed into the tomato center and then the upper portion of a 6-oz tomato for respective test measurements.

Also, rubber samples from sidewalls of used automobile tires were ultrafrozen to create conditions of frangibility or embrittlement prior to grinding operations. These were cut into sections of about 2-in. by 3-in. sizes and were about ⅜-in. thick. Initially, crawfish, blue crab, tomatoes, and rubber were placed into a 10-in. square by 2-in. deep polyethylene container of 1/16-in. thickness for separate freeze tests in quantities of 2 to 3 lbs. for each product. The crawfish, crabs, and tomatoes were ultrafrozen in single layers, and the rubber sidewall sections were frozen in two layers with the temperature-time measurements made as described. It should be noted that when fresh crawfish are cooked or blanched, the tail sections become curled such that a portion of the tail backs are in contact with the freezing container; therefore, the sensor is actually farther from the bottom of the polyethylene container [and bottom plate (13) of the tunnel (14)] than its thickness position in the tail-meat section. The blue crab were ultrafrozen with the backs in the upward position.

In considering the three $LN_2$-containment modes described, it is obvious that numerous freezing procedures are available for the prototype embodiment of the present invention. For example, for each containment mode I, II, and III, there are available seven cooling methods (A through G) or twenty-one different basic procedures; other techniques are available such as bottom-plate freezing only for certain time periods followed by dispersion of either coolant liquid or vapor for additional time periods (and vice versa). Bottom-plate procedures utilizing negative-pressure (vacuum), atmospheric-pressure, or positive-pressure coolants plus externally supplied coolant liquid or vapor as could be provided through Valve (17) or Valve (20) respectively shown in FIGS. 1, 2, and 3 of three-way designs. Thereafter, the options are numerous and will be expounded upon in further discussion of the preferred embodiments.

In presenting some of the initial test results, only those for Containment-Mode II are shown in detail in Table 1. Radiant-heat absorption by the sides and top of the tunnel (14) and convectional cooling by the residual air inside the tunnel (14) occur in each of the methods described with the primary ultrafreeze methods (bottom-plate, $LN_2$ vapor or liquid, and $LN_2$-coolant pressure) designated. The ultrafreeze times for the various temperature levels discussed were measured from an initial product (ambient) temperature of about 300 K. (80–81° F.). This is a warmer initial temperature than would normally be used in a more efficient operation, but was used to create conditions more prone to create breakage or rupturing if each were to occur.

The preferred procedures utilize Method IIB, i.e., bottom-plate cooling at 1-atm pressure and 78-K bottom-plate temperature, with vapor dispersed onto the product (30) via dispersion-tube (18) as heat is absorbed from the product (30) and external atmosphere. The apparatus (10) is relatively poorly insulated creating somewhat more liquid-nitrogen to vapor conversion than is actually created from the product-heat absorption. However, this will be addressed in a subsequent preferred embodiment of the invention which will obviously be more efficient than the prototype embodiment. Further contributing to the relative inefficiency of the initial test procedures is the higher initial temperatures of the test items which for large-scale operations would be about 35° F. or lower as obtained by mechanical or other means.

Some test results for Containment-Mode II are shown in Table I:

In freezing tomatoes, crawfish, blue crab, and rubber specimens utilizing Containment-Mode II, various times to reach certain temperature levels are shown as follows (Initial Temperature≈300 K. (80°–81° F.):

TABLE I

| TIME TO: | 144K(−200° F.) | 116K(−250° F.) | 89K(−300° F.) | 80K(−315° F.) |
| --- | --- | --- | --- | --- |
| Method IIA (1-atm Bottom-Plate Cooling; No. $LN_2$-Vapor or Liquid Spray) | | | | |
| Tomato (6 oz) | | | | |
| Center | 16.0 Min | 19.5 Min | 20.5 Min | 30.0 Min |
| Top | 24.0 | 25.5 | 26.5 | 35.0 |
| Crawfish (1.5 oz) | | | | |
| Center | 4.5 | 5.5 | 7.7 | 19.0 |
| Top | 6.0 | 7.0 | 12.5 | 26.0 |
| Blue Crab (15 oz) | | | | |
| Center | 7.0 | 8.5 | 10.5 | 23.0 |
| Top | 9.0 | 10.0 | 13.5 | 26.0 |
| Rubber | | | | |
| (First Layer) Top | 4.0 | 6.0 | 9.0 | 16.0 |
| (Second Layer) Top | 6.0 | 7.5 | 12.0 | 19.0 |
| Method IIB (1-atm Bottom-Plate cooling; $LN_2$ Vapor) | | | | |
| Tomato (6 oz) | | | | |
| Center | 15.0 | 17.0 | 18.0 | 26.5 |
| Top | 18.5 | 19.5 | 20.5 | 24.0 |
| Crawfish (1.5 oz) | | | | |
| Center | 4.0 | 5.0 | 6.5 | 12.0 |
| Top | 5.0 | 6.0 | 9.5 | 20.0 |

TABLE I-continued

| TIME TO: | 144K(−200° F.) | 116K(−250° F.) | 89K(−300° F.) | 80K(−315° F.) |
|---|---|---|---|---|
| Blue Crab (15 oz) | | | | |
| Center | 6.5 | 8.0 | 9.5 | 16.5 |
| Top | 8.5 | 9.0 | 11.5 | 20.0 |
| Rubber | | | | |
| (First Layer) Top | 3.5 | 5.0 | 7.5 | 12.0 |
| (Second Layer) Top | 5.0 | 6.5 | 10.5 | 14.0 |
| Method IIC (1.1 atm Bottom-Plate Cooling; LN₂ Spray) | | | | |
| Tomato (6 oz) | | | | |
| Center | 13.5 | 15.0 | 16.0 | 23.5 |
| Top | 18.0 | 18.5 | 19.0 | 20.0 |
| Crawfish (1.5 oz) | | | | |
| Center | 4.0 | 4.5 | 5.5 | 10.5 |
| Top | 4.5 | 5.5 | 8.0 | 15.5 |
| Blue Crab (15 oz) | | | | |
| Center | 6.0 | 7.5 | 8.5 | 15.0 |
| Top | 7.5 | 8.0 | 10.5 | 17.5 |
| Rubber | | | | |
| (First Layer) Top | 4.0 | 4.5 | 6.5 | 10.0 |
| (Second Layer) Top | 4.0 | 5.0 | 9.0 | 12.0 |
| Method IID [1.3 atm Bottom-Plate Cooling; No. LN₂-Vapor or liquid spray; Minimum Temperature = 82K(−310° F.] | | | | |
| Tomato (6 oz) | | | | |
| Center | 18.0 | 21.5 | 23.0 | Not Measured |
| Top | 26.0 | 27.5 | 30.0 | Not Measured |
| Crawfish (1.5 oz) | | | | |
| Center | 5.0 | 6.0 | 8.0 | Not Measured |
| Top | 7.0 | 8.5 | 14.0 | Not Measured |
| Blue Crab (15 oz) | | | | |
| Center | 9.0 | 10.5 | 12.5 | Not Measured |
| Top | 11.5 | 12.0 | 16.0 | Not Measured |
| Rubber | | | | |
| (First Layer) Top | 4.5 | 7.5 | 10.0 | Not Measured |
| (Second Layer) Top | 6.5 | 8.5 | 14.0 | Not Measured |
| Method IIE (1.3 atm Bottom-Plate Cooling; LN₂-Vapor Spray) | | | | |
| Tomato (6 oz) | | | | |
| Center | 17.0 | 19.5 | 20.0 | Not Measured |
| Top | 20.0 | 21.0 | 22.0 | Not Measured |
| Crawfish (1.5 oz) | | | | |
| Center | 4.5 | 5.0 | 7.0 | Not Measured |
| Top | 4.5 | 5.5 | 7.0 | Not Measured |
| Blue Crab (15 oz) | | | | |
| Center | 5.5 | 6.5 | 8.5 | Not Measured |
| Top | 5.5 | 6.0 | 7.0 | Not Measured |
| Rubber | | | | |
| (First Layer) Top | 4.5 | 6.5 | 8.5 | Not Measured |
| (Second Layer) Top | 4.5 | 6.0 | 9.0 | Not Measured |
| Method IIF (1.3 atm Bottom-Plate Cooling; LN₂ Spray) | | | | |
| Tomato (6 oz) | | | | |
| Center | 14.5 | 15.5 | 16.0 | 18.5 |
| Top | 13.0 | 14.0 | 15.0 | 17.5 |

TABLE I-continued

| TIME TO: | 144K(-200° F.) | 116K(-250° F.) | 89K(-300° F.) | 80K(-315° F.) |
|---|---|---|---|---|
| Crawfish (1.5 oz) | | | | |
| Center | 4.0 | 4.0 | 6.0 | 7.0 |
| Top | 4.0 | 4.5 | 5.5 | 6.0 |
| Blue Crab (15 oz) | | | | |
| Center | 7.0 | 8.0 | 8.5 | 14.0 |
| Top | 6.5 | 7.5 | 8.0 | 13.0 |
| Rubber | | | | |
| (First Layer) Top | 4.0 | 5.0 | 6.0 | 9.0 |
| (Second Layer) Top | 3.5 | 4.5 | 5.5 | 8.0 |
| Method IIG [0.7-atm Bottom-Plate Cooling (No $N_2$-Vapor or Liquid Spray); Minimum Temperature = 75K (-325° F.) | | | | |
| Tomato (6 oz) | | | | |
| Center | 14.0 | 17.5 | 18.0 | 27.0 |
| Top | 21.0 | 23.0 | 24.0 | 31.0 |
| Crawfish (1.5 oz) | | | | |
| Center | 4.0 | 5.0 | 6.0 | 16.0 |
| Top | 5.5 | 6.0 | 11.0 | 21.0 |
| Blue Crab (15 oz) | | | | |
| Center | 6.0 | 8.0 | 9.0 | 20.0 |
| Top | 8.5 | 9.5 | 12.0 | 22.5 |
| Rubber | | | | |
| (First Layer) Top | 4.0 | 5.5 | 8.0 | 14.0 |
| (Second Layer) Top | 5.5 | 6.5 | 10.5 | 17.0 |

It was observed that the cooling methods of Containment-Mode II resulted in about 10% more rapid cooling in the top portions of the samples and very nearly the same times for the center portions than the corresponding methods of Containment-Mode I. This indicates somewhat more cooling effects by radiant and convectional-heat absorption when the liquid nitrogen completely encompasses the tunnel, especially for the upper portions of the products. The time requirements for cooling to the indicated temperature levels were very nearly preclusive [e.g., about 50 minutes for the top of the 6-oz. tomato specimen to reach 144 K.(-200° F.) using Method IIIA ($LN_2$ level below the bottom plate; no $LN_2$ vapor or liquid spray); also, the lesser $LN_2$ volumes of Modes I and III necessitated frequent filling of the $LN_2$ coolant to maintain the $LN_2$-containment levels, especially when $LN_2$ liquid, and to a lesser extent $LN_2$ vapor, was sprayed onto the products. Also to be noted is that the greater-mass blue crab required only a relatively small increase in freezing times than those of the smaller-mass crawfish; this is due, in part, to the fact that the heights of the crab above the bottom plate were only slightly higher than that of the crawfish. In addition, the contact areas of the bottom crab portions were greater than those of the crawfish and enhance thermal conduction to the bottom plate (13).

When $LN_2$ vapor or spray was used in cooling the tomatoes, crawfish, or blue crab to 89 K. (-300° F.) utilizing Containment-Mode I or III at 1.3-atm pressure, the Mode-I $LN_2$ was below the plate and Mode III $LN_2$ exhausted before 89 K. was attained. Furthermore, because the test products were cooled in finite quantities, a constant inflow of available heat from the products was not available either for coolant liquid to vapor conversion for vapor-spray use or vapor-pressure creation for liquid-spray use. Instead, the spray rates would diminish as the products were cooled to more nearly the temperature of the $LN_2$ coolant.

This diminished spray rate was especially noticeable for the 1.1-atm $LN_2$-spray procedures where the 1.1-atm pressure was barely sufficient to force $LN_2$ through dispersion tube (18) for $LN_2$ spraying. This would not be the case for a conveyor-system operation whereby, generally, a constant influx of heat would be available for vapor generation. This would especially be of importance in a well-insulated system which will be discussed subsequently in describing the design of the preferred embodiments of the invention.

Of the different methods used, Method IIB is preferred. Since the $LN_2$ totally encompasses the tunnel (14) and is of larger volume, less $LN_2$-coolant addition is required. Also, somewhat greater radiant-heat absorption occurs because of the lower temperature of the sides and top of the tunnel (14). It is to be noted that gradient or directional cooling still occurs even though the side and top temperatures of the tunnel (14) are the same as that of the bottom plate (13). So long as sufficient heat-transfer mechanisms exist, but not extremely high vapor-or $LN_2$-spray velocities and quantities, via dispersion-tube (18), too-rapid isothermal cooling, which may result in breakage, fracture, or rupturing of many food products, does not occur.

High-moisture products such as tomatoes, crawfish and crab in the shell, and others are very susceptible to such breakage or fracturing problems. Of the methods indicated in Table I, only one case of fracturing was observed; this was for Method IIF (1.3-atm Bottom-Plate Cooling, $LN_2$ Spray) in which case a single tomato was fractured around the insertion site of the temperature sensor. Several additional tests indicated no such difficulty, so the problem appears to have been caused by improper care in inserting the sensor.

Immediately after the various ultrafreeze operations, all food products were placed into vacuum bags and placed into frozen storage at about −5° F. at which level temperature equilibration is attained within the body of the product.

As stated earlier, the preferred ultrafreeze method is that of Method IIB, i.e., 1-atm bottom-plate cooling plus the $LN_2$ vapor-spray generated by heat absorption from the product. This is also the most efficient since the 1-atm heat-of-vaporization vapor equivalent (199.3 KJ/Kg) of the 77.3-K.(−320°-F.) liquid nitrogen is utilized for the gradient or directional cooling procedure with the created vapors redirected, via dispersion-tube (18), onto the product 30 at very nearly the temperature of the coolant.

Cooked whole Gulf-coast blue crab and crawfish (both in the shell) frozen in this manner and stored in freezer bags at temperatures of about −5° F. retained their quality, texture, and palatability for periods of over one year and probably could have been stored longer. Tomatoes, grapes, strawberries, oranges, blanched crab meat and crawfish-tail meat (packaged prior to freezing) were frozen in the manner of Method IIB with no noticeable detriment in texture or palatability after several weeks frozen-storage times. Other more controlled tests such as bacteria counts and drip-loss measurements remain to be performed after ultrafreeze operations and extended long-term storage.

The various times, shown in TABLE I, required to cool to the different temperature levels correspond generally to the heat-loss requirements needed to attain such low levels based on specific-heat values and heats-of-fusion-(or freezing) requirements. Some of these values, taken from thermodynamics and materials handbooks, are shown as follows, along with nominal moisture content, in TABLE II:

TABLE II

|  | SPECIFIC HEAT (Before Freezing) Kj/Kgk | SPECIFIC HEAT (After Freezing) Kj/KgK | HEAT OF FUSION KJ/Kg | MOISTURE CONTENT % |
| --- | --- | --- | --- | --- |
| Tomatoes | 3.9 | 2.1 | 314 | 94 |
| Crawfish | 3.4 | 1.8 | 260 | 77 |
| Blue Crab | 3.4 | 1.8 | 260 | 77 |
| Rubber | 1.4 | — | — | — |

As stated earlier, rubber does not freeze, but does become brittle or frangible at certain low temperatures. Therefore, the heat-of-fusion equivalent does not have to be absorbed from the coolant, and less amounts of $LN_2$ are required than for the other products. For demonstrative purposes, freezing-temperature levels for tomatoes, crawfish, and blue crab, were assumed to be 272 K.(30° F.). These levels, however, may vary depending on such factors as degree of ripeness or age, fullness or meat content, as well as salinity and other factors.

An important test not shown in Table I entailed in the use of $CO_2$ in cooling rubber to low-temperature levels. The cost of $CO_2$ per BTU of cooling capability is about 30–35% cheaper than for liquid nitrogen and allows more-rapid cooling rates although only to a minimum temperature level of 195 K.(−109° F.). When liquid $CO_2$, maintained in a storage container at about 300 psia, is sprayed in an appropriate spray pattern onto a product at 1-atm pressure, about 54% of the $CO_2$ liquid forms $CO_2$ snow (dry ice) and 46% forms $CO_2$ vapor at 195 K. The heat of vaporization (sublimation) of $CO_2$ snow (dry ice) is 573 KJ/Kg and the heat capacity of the vapors, both of that formed from the sprayed $CO_2$ liquid at 195 K.(−109° F.) and the sublimed vapors, is about 0.82 KJ/KgK(1-atm Cp). The heat capacity of the $CO_2$ snow is about 1.38 KJ/KgK. The 1-atm heat of vaporization of $LN_2$ is about 199.3 KJ/Kg and the specific heat (Cp) of $LN_2$ vapor is about 1.03 KJ/KgK. Therefore, $CO_2$, both $CO_2$ snow and vapor, may be used to cool products to 195 K.(−109 K.) with greater cooling capability than $LN_2$, e.g., 573 KJ/Kg vs 199.3 KJ/Kg heats-of-vaporization levels for $CO_2$ snow and $LN_2$ respectively, plus additional cooling by the unsublimed $CO_2$ snow (≈1.38/KJ KgK) and $CO_2$ vapors (≈0.82 KJ/KgK). Thus, if products are previously cooled to 195 K.(−109° K.) prior to being further cooled to lower-temperature levels by $LN_2$, obviously less $LN_2$ cooling time and $LN_2$-coolant quantities are required.

For example, if one Kg of rubber were cooled from 300 K. (80° F.) to 89 K.(−300° F), the amount of heat removed from the rubber would be: 1 Kg (rubber)×(300 K.−89 K.)×1.4 (specific heat of rubber)=295.4 KJ. If $LN_2$ alone were used for cooling from 300 to 89 K., the amount of $LN_2$ required would be 295.4/199.3=1.48 Kg (3.3 lbs). If $CO_2$ snow were used to cool to 195 K. (109 K.), the amount of heat removed would be 1 Kg (rubber)×(300—195)×1.4= 1.47 KJ. The amount of $CO_2$ used would be 147 Kg/573 Kg=0.26 Kg of $CO_2$ snow. This 195 K. rubber would then be farther cooled to 89 K. requiring heat removal of: 1 Kg (rubber)×(195–89)×1.4=116.6 KJ. The amount of $LN_2$ required would be 116.6/199.3=0.59 Kg=1.99 lbs. (1 Kg=2.2 lbs.). This is significantly less than the 3.3 lbs of $LN_2$ required if no $CO_2$ snow were used.

Referring to TABLE I and Method IIB, when about 2.5 lbs of sidewall rubber (2 layers) were cooled from 300 K. (80° F.) by 1-atm $LN_2$, plus the vapor generated by heat absorption from the rubber, the respective times for the rubber (top layer) to reach 144 K.(200° F.), 116 K(−250° F.), 89 K.(−300° K.), and 80 K.(−315° F.) were 5.0, 6.5, 10.5, and 14 minutes. When the top rubber layer was sprayed with $CO_2$ snow (about 0.5-in thick with some filtering of $CO_2$ snow to the bottom layer) the time for the top layer to reach 197 K. (−105° F.) was about 2.0 minutes. The container of rubber along with the 0.5-in $CO_2$ snow layer was then placed into the cooling space of the test apparatus.

The respective times for the temperature levels of the top layer to again reach 114 K.(−200° F.), 116 K.(−250° F.), 89 K. (300° F.), and 80° K.(−315° F.) from 197 K.(−105° F.) were 2.0, 3.0, 6.5, and 8.0 minutes. In addition, the 195-K(−109° -F) $CO_2$ snow was also at a temperature of less than −300° F. after being cooled along with the rubber. When the rubber, along with the lower-temperature $CO_2$ snow, was placed immediately into a grinder, the time for the rubber to be ground (through a screen) into 32-mesh sizes was about 20 seconds in a single operation. This compares to about 5 minutes in multiple-grinding operations for non-chilled rubber. Some of the $CO_2$ snow remained after the grinding operations.

This indicates the feasibility of using $CO_2$ not only for more efficient cooling to low temperatures for frangiation and embrittlement, but for the additional use of $CO_2$ snow cooled to cryogenic-temperature levels for a greater range of 1.38-KJ/Kg K specific-heat-capacity cooling by $CO_2$ snow (from below 89 K.(−300° F.) if required. This would assure that longer low-temperature retention times for subsequent $LN_2$-cooling operations (such as crushing, grinding, and separation procedures). Frangiation-level temperatures for rubber are generally reported to be 172 K. (−150° F.) to 153 K. (−185° F.) depending on the type rubber and metal/fiber content.

Tests utilizing $CO_2$ as a coolant were limited to rubber. However, its use to more efficiently attain cryogenic-temperature levels, 116 K. (−250° F.), in food products is not precluded.

DESCRIPTION OF PREFERRED EMBODIMENTS

The four primary preferred embodiments of the invention involve (1) a horizonal cylinder having a horizontal tunnel, (2) a vertical cylinder utilizing a circular tunnel near the bottom of the cylinder, (3) a vertical container having a spiral tunnel, and (4) a container having a shelf system with doors utilizing coolant contained inside the shelves in communication with liquid coolant contained in a space in the sides, bottom, and top of the unit.

Each apparatus consists essentially of those components comprising the test embodiment which are a container and a freeze space or tunnel having a flat bottom within the container. The freeze space or tunnel is encompassed by a low-temperature liquid coolant or cryogenic liquid coolant in the annular space between the container and the tunnel. The cryogenic-liquid is placed at various levels above the tunnel, along its sidewalls or below the bottom plate of the tunnel.

The preferred cryogenic coolant is liquid nitrogen ($LN_2$). Preferably, the coolant level completely encompasses the tunnel. The primary cooling or freezing modes are of $LN_2$ in contact with the bottom of the tunnel which in turn contacts the bottom of the product or products container. Typically, the product is moved through the tunnel on a conveyer. If the coolant level is below the bottom of the tunnel, the tunnel bottom may be contiguous to saturated vapor formed above the $LN_2$ level.

As well be explained in more detail, the products may be cooled to cryogenic-temperature levels by cooling from the bottom plate of the tunnel alone (at higher or lower pressures for respectively higher or lower temperatures) or with additional cooling from higher- or lower-pressure $LN_2$-vapor spray emanating from dispersion tubes along the top of the tunnel to the product for more rapid (but more isothermal or less-directional) cooling. Even more rapid cooling of the product may be achieved by $LN_2$-liquid spray at high or low pressures through dispersion tubes above the product. Warmer-temperature freezing or cooling levels may be attained with the $LN_2$ level below the bottom plate and with similar $LN_2$-vapor or liquid-spray procedures as above.

Various versions of the apparatus may be used for stationary cooling or freezing, or conveyor cooling or freezing, or freeze-dry method by utilizing low pressure in the tunnel, or lower than 1-atm temperature levels of the coolant by creating low-pressure in the annular coolant-containment space.

Each apparatus is designed to provide directional or gradient freezing primarily from the bottom to the top of a product or food products (to minimize creation of internal stresses resulting in breakage) or to create states of embrittlement or frangibility in materials to be reclaimed for subsequent crushing or grinding operations by using less directional (more isothermal) cooling procedures such as bottom to top cooling plus simultaneously cooling of the top and sides of the material by vapor or liquid-coolant spraying.

Top-side cooling is attained by utilizing vapors created by the coolant's absorption of heat from the product via the tunnel bottom plate creating latent heats-of-vaporization equivalent vapors from the coolant ($LN_2$) which are directed through a dispersion tube to be sprayed onto the product.

The vapors may also be used to create pressure in the space (ullage) above the liquid ($LN_2$) sufficient to force $LN_2$ through a dispersion tube for additional liquid-spray cooling of the product.

The liquid coolant may be used at higher pressures for warmer bottom-plate cooling and higher-velocity liquid or vapor spraying or lower pressures for colder bottom-plate temperatures and slower liquid or vapor velocity.

The system may also incorporate liquid or vapor usage from an external source to be used in conjunction with the internal liquid coolant's bottom-plate cooling. The system may be designed for freezing products as they are conveyed, via a belt, through the tunnel, or the tunnel or freeze space may be used for non-conveyor methods with doors attached to each end of the tunnel. The system may also be used for vacuum freezing (freeze drying) by freezing and then pulling a vacuum in the freeze space with doors attached.

Figure 4:
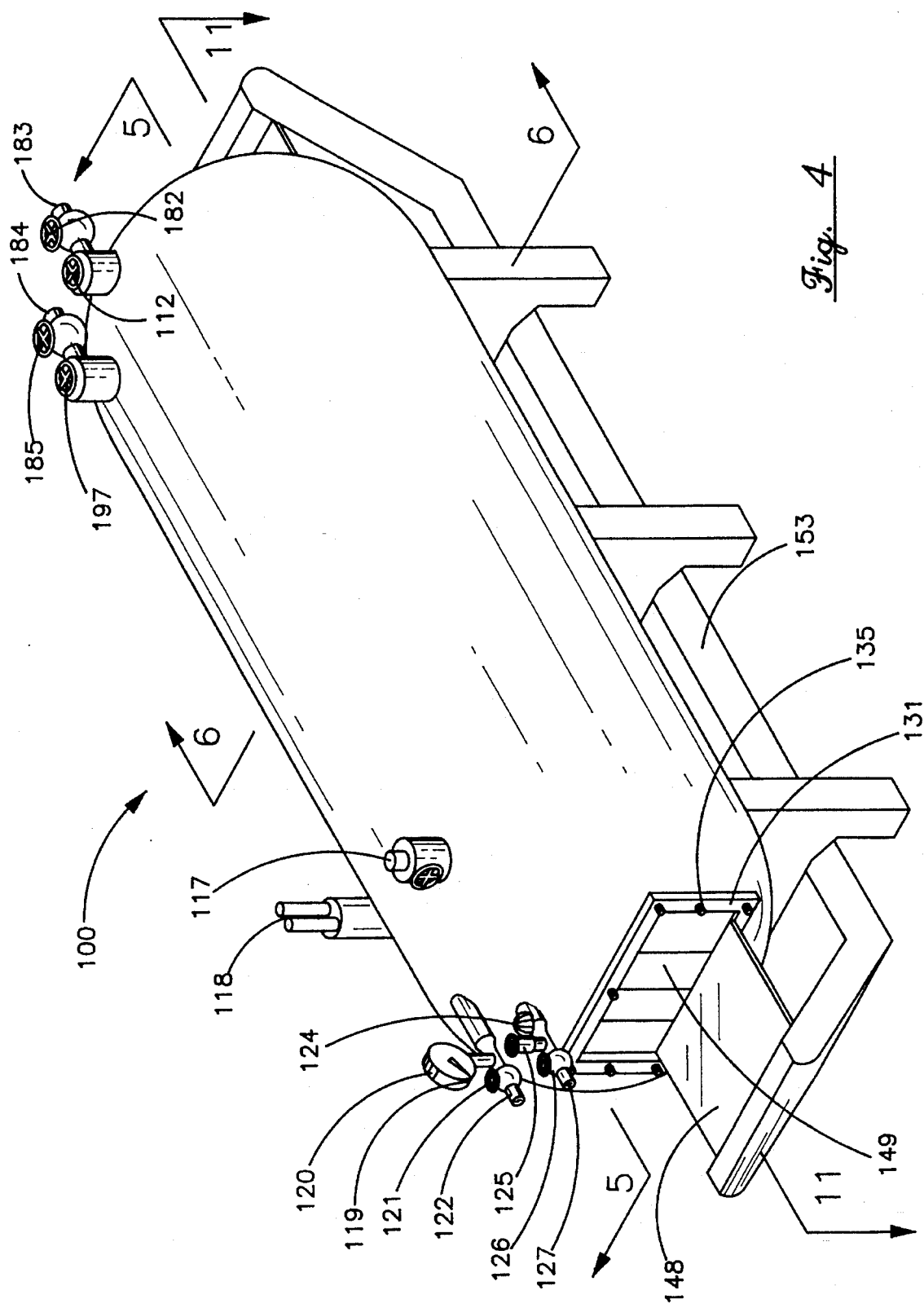
FIG. 4 is an isometric view of the first preferred embodiment showing a horizontal container.
Figure 5:
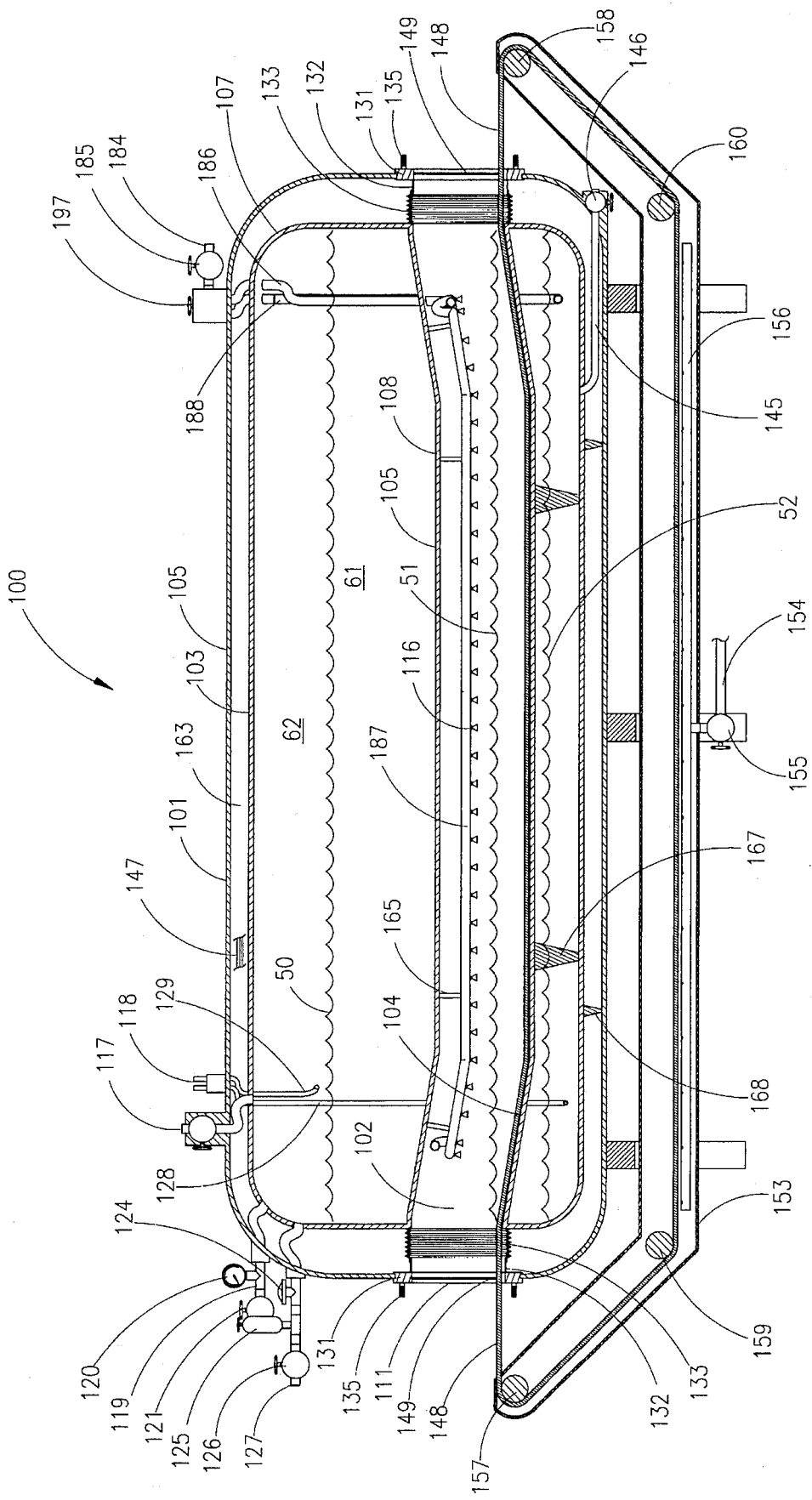
FIG. 5 is a longitudinal cross-sectional view of the embodiment of FIG. 4.
Figure 6:
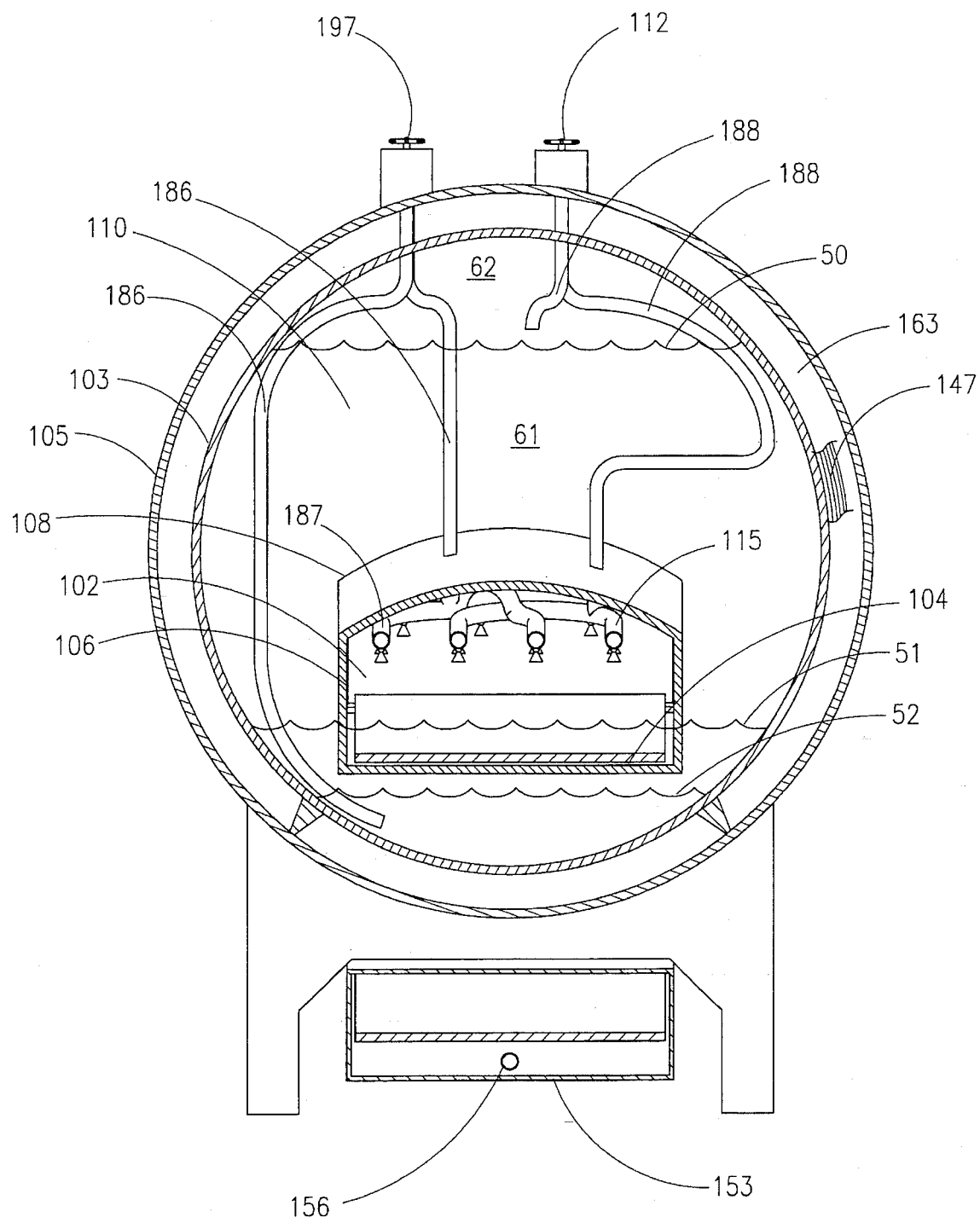
FIG. 6 is a transverse cross-sectional view of FIG. 4.

FIG. 4 shows a isometric external view of the first preferred embodiment (100) of the invention. FIG. 5 is horizontal cross-sectional view of FIG. 4. FIG. 6 is a cross-sectional end-view of the apparatus (100). The preferred embodiment (100) of the invention is comprised of a horizontal positioned cylindrical pressure vessel (101). The vessel (101) has an inner shell (103) and an outer shell (105). Situated within the inner shell (103) of the pressure vessel (101) is a chamber. In the first preferred embodiment the chamber is a tunnel (102) extending from one end of pressure vessel (101) to the other. Tunnel (102) has a wide flat bottom plate (104), vertical sidewalls (106) and a domed top (108). Heads (107) at each end of the inner shell (103) are radiused inward to connect with the ends of the bottom plate, sidewalls and top of the tunnel (102) to form an annular space (110) between the inner shell (103) and the tunnel (102). Heads (109) at each end of the outer shell (105) are radiused inward to form entry or exit ports (111) which communicates with passages (113) for access to the tunnel (102). A vacuum jacket (163) is also formed between the shells (103) and (105) and heads (107) and (109) along the outer periphery of the vessel (101).

Support structures (168) along the bottom of the vessel (101) between the inner shell (103) and the outer shell (105) may be utilized to support the weight of the apparatus (100).

The tunnel (102) and the inner shell (103) forming the annulus (110) are to be exposed to along its length, is a tunnel (102) having levels and maximum pressures to 3.4 atm (50 psia). They are therefore to be designed, fabricated and pressure tested in accordance with Boiler and Pressure Vessel Codes of the ASME or the British Standards Institute to operate at pressures above 15 psia. The preferred material for the tunnel (102) and the inner shell (103) and the structural components which form the annulus (110) is 304 stainless steel (SA-240).

As a general guideline, the bottom plate (104) of the tunnel (102) should be designed as thinly as possible. Additional stiffener rings and supports (167) along the bottom plate (104) may be utilized in the design to allow a thinner-bottom plate provided there is compliance with the pressure vessel codes. These supports (167) should be generally wedged shaped to minimized their contact with the outer shell so as to reduce external heat influx and should be made of a G-10 or equivalent material having a high strength and a low thermal conductivity.

The outer shell (105) and its heads (109) may be constructed of mild to medium carbon steel (A36) as the vacuum jacket (163) between the inner and outer shell is not exposed to pressures greater than 1-atm (15 psia) and may not necessarily have to conform to the pressure vessel codes.

Though dimensions may vary, to give an idea of the scale of the preferred embodiment, the vessel (101) has an overall length of forty-two feet, an outer-shell (105) diameter of ninety-five inches and an inner-shell (103) diameter of eighty-four inches. The tunnel (102) is comprised of a fifty-four inch wide bottom plate (104), twelve inch high sidewalls (106), and has a fifteen-inch height from the bottom plate (104) to the center of the domed top (108).

The tunnel (102) includes sloped sections 102A, which are sloped upward at each end at an angle not exceeding 20° for an approximately 2-foot incline where the bottom plate, sidewalls and top are connected to the heads (107). Sloped sections 102A place the level of the bottom plate (104) lower than the level of the entry and exit ports (111) and comprise a means for retaining colder and therefore denser, coolant vapors in the cooling or ultrafreeze space (114) with the tunnel (102). This is important in processing certain materials, such as those to be frangiated or embrittled, where less directional or gradient cooling may be desired, or where certain food products, especially those not extremely fragile or high in moisture content, are processed. The use of a non-sloped tunnel for greater directional or gradient cooling or ultrafreezing is not precluded, however.

Bellows-type stainless steel expansion joints (133) and plastic connecting sections (132) are attached to heads (107) and (109) between the inner sheet (103) and outer shell (105) either by welding or bolting and bonding (using low-temperature industrial-grade epoxy glue) to form walls for the vacuum jacket (163) and the passage (113) between the ends of the tunnel (102) and the entry and exit ports (111). The plastic connecting sections (132) are preferably made of grade G-10 plastic or materials having equivalent thermal and strength characteristics.

It is preferred that the stainless steel expansion-joint sections (133) be bolted and bond sealed to assure ease of removal for possible future repairs. The expansion joints (133) are rectangular and are of sufficient height and width to allow manual entry into the tunnel for possible repairs and cleaning and of sufficient width to allow for contraction of the tunnel (102) and inner (103) shell when low-or cryogenic-temperature levels are reached. The outer ends of the expansion joints (133) are bolted and sealed to the thin-walled, low-thermal conductivity plastic connecting sections (132) which have the same dimensional configuration as the expansion joints (133). The sealant-bond material is again low-temperature, industrial-grade epoxy.

The plastic connecting sections (132) are attached, using bolts, and again sealing with low-temperature high-strength industrial-grade epoxy, to thick-walled plastic flanges (131) of G-10 type material which, in turn, are bolted and epoxy sealed to the heads (109) which are welded to the outer cylindrical shell (105). The connecting sections (132), because of their low thermal conductivity and small thin-walled cross-sectional areas, minimize heat inflow from the external atmosphere to the expansion joints (133). These expansion joints (133), although made of 304 stainless steel, act somewhat as an additional external heat barrier because of the long thermal path due to their multiple-chevron fabrication pattern. Both the connecting sections (132) and the expansion joints (133) forming the thermal path minimize external heat entering the tunnel (102) and ultrafreeze space (114).

The thick-walled G-10 flange sections (131) are of sufficient strength to support the outer shell heads (109) which are attached to the outer perimeters of the flanges (131) which, in turn, border the rectangular entry and exit ports (111). The outer periphery of the flanges (131) to which the A-36 carbon-steel heads (109) are attached, proscribe or minimize the shell head material in contact with or in near proximity to the cold vapors exiting the ultrafreeze space (114) of the tunnel (102) which could severely diminish the structural strength of the A-36 material (by low-temperature embrittlement) and create susceptibility to fatigue-strength failure due to contraction and expansion of the inner portion of the apparatus at low temperatures.

If such were not the case, much more expensive material, such as 304 stainless steel, would have to be used for the outer shell heads (109). The use of G-10 material (or low thermal-conductivity, high-strength equivalents) for such purposes is considered innovative and within the scope of the present invention, and proscribes use of such methods in other types of commercial freezing systems, such as, precluding vapors emanating from, vapor, liquid-spray immersion, or others, from contacting other metal shells of such systems.

The flanges (131) at the entry and exit end of the tunnel (102) are approximately 1.0 to 1.5-in. thick and include O-ring seal slots (134) and threaded studs (135) which protrude from the flanges (131). The studs (135) are screwed and cemented with epoxy into holes drilled and threaded into flange (131) to a depth of about one-half the flange thickness.

Figure 7:
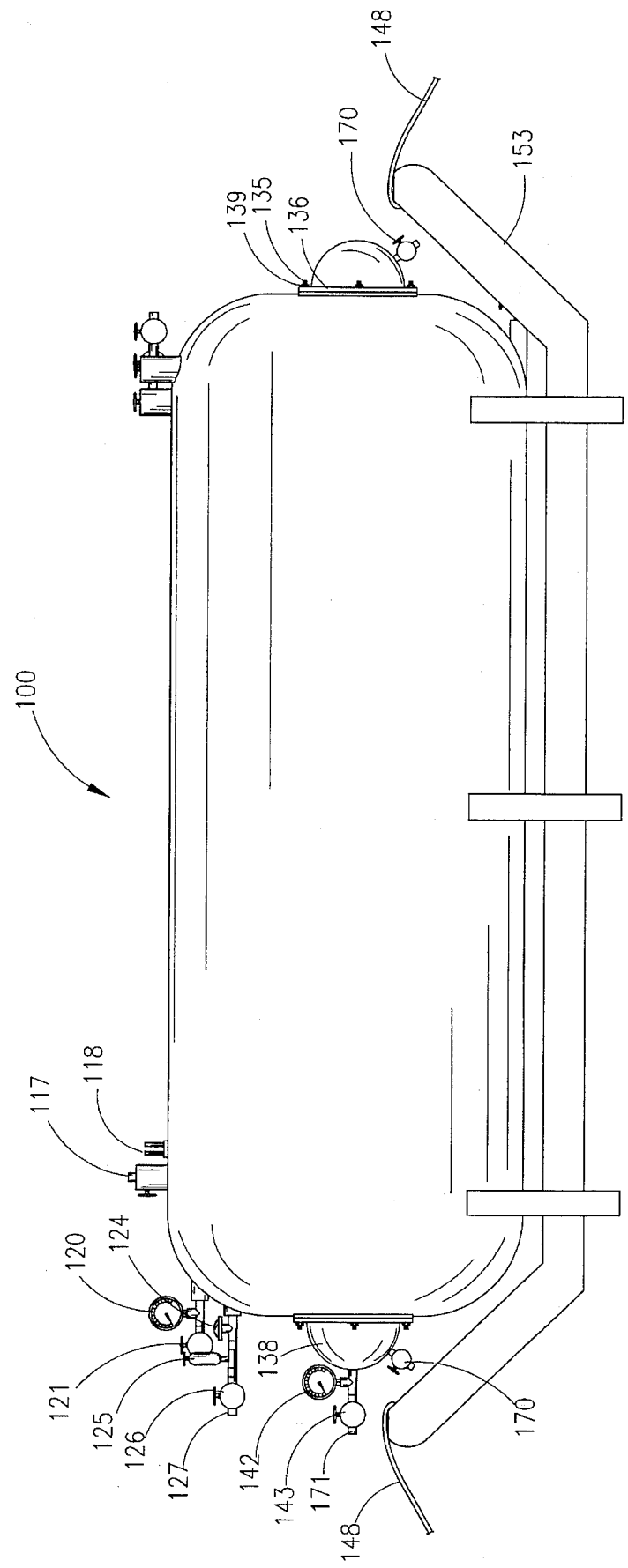
FIG. 7 is a side view of the embodiment of FIG. 4 with conveyor detached.

The FIG. 7 is a side view of apparatus (100) showing doors (138) and (139) in place for a closed system. Doors (138) and (139), illustrated by FIGS. 8, 9, and 10 may be attached and sealed to the flanges (131) at the entry and exit ends of the apparatus (101) by the studs (135) for non-conveyor operations including stationary-freezing and freeze-drying methods to be discussed later.

For conveyor operations, flaps (149) are attached to the tops of flanges (131) and extend to the bottom plate (104) and conveyor belt (148) at each port (111). These flaps may be made of thin low-temperature transparent polyurethane layers or other commercially available low-temperature plastic materials with good flex characteristics at cryogenic-temperature levels. Sheets of thin reflective aluminum or Mylar may be sandwiched, using low-temperature glue, between the layers to provide additional heat reflectivity for the flaps which would be slotted at about 3-inch intervals. The flaps (149) provide additional retention of the coolant vapors inside the tunnel (102) and must be of sufficient flexibility to allow entry and exit of conveyed materials. The flaps are designed to be screwed into the upper inner periphery of the flanges (134) and to be removable to allow attachment of the doors (137 and 139) when stationary ultrafreeze or freeze-dry operations are to be performed.

The outer wall (103) is wrapped with commercially available, heat-reflective, multi-layer insulation material (147), referred to as super insulation (S/I). The S/I material consists of layers of about 0.006-mm aluminum foil and 0.15-mm fiberglass spacing material. The S/I layers are wrapped at a density of 60–75 layers per inch for three inches around the outer wall (103) inside the vacuum jacket (163). The outer portions of heads (107), partially comprising the vacuum jacket (163), are also wrapped with the S/I material (147) at the same density and distance as are the expansion-joint (133) and plastic connecting sections (132) comprising the inner walls of the vacuum jacket (163) around the entry and exit ports (111) the tunnel.

A conveyor system is used to bring product into and out of the tunnel (102) through the entry and exit ports (111). The conveyor system is comprised of a belt, a frame, a power-drive mechanism, gears (57, 58, 59, and 60), and other associated components which are commercially available for either horizontal, circular, or spiral systems. The option exists for the conveyor to enter, exit, traverse through a rectangular housing space (153), and then re-enter the tunnel (102) on a continuous cycle. This method would require loading and unloading areas outside of and adjacent to the entry and exit ports (111). After materials such as rubber are cooled to low temperatures for embrittlement or frangiation, the materials may be dumped directly from the belt (148), after exiting the tunnel (102), into grinding or crushing equipment located at a lower level than the conveyor belt, for example, before the belt enters the housing (153) and traverses back to the entrance of the tunnel.

Food products may exit the tunnel (102) via the conveyor belt (148) directly into a frozen-storage area or be unloaded for transfer to frozen-storage areas. Various materials are commercially available for belt use (as well as complete component systems) including stainless-steel and plastic belting. The preferred conveyor-belt material is to be of a plastic compound, such as commercially-available glass-filled Teflon, which may be thin and of low mass allowing good heat-absorption characteristics as the belt traverses the tunnel in contact with the cold bottom plate (104). The material has low frictional coefficients and high-strength tear limits which allow high-weight loads to be conveyed through the apparatus and is also flexible at cryogenic-temperature levels. The use of stainless steel or other materials is not precluded, however, but a greater heat load would be created and diminish the cooling efficiency of the apparatus if conveyor belts such as higher-mass stainless steel were used.

The aluminum housing (153), through which the belt 148 passes, is located under the outer shell (105), as illustrated in FIGS. 4, 5, and 6, and is designed for introduction of external nitrogen gas, from nitrogen line (154) via valve (155) through dispersion tube (156), at a slightly positive pressure ($\approx 1$ to 2 psig) to minimize the formation of frozen condensate from the external atmosphere on the low-temperature belt after exiting the tunnel (104). If required, the nitrogen gas may be heated somewhat, e.g., by resistance-heating tape wrapped around the uninsulated nitrogen line (156).

If the apparatus were incorporated into a flow system requiring usage of the same belt (148) for prior pre-ultrafreeze operations, the housing length may be extended to address the longer-belt requirements. Such would be the case for the previously-discussed $CO_2$-cooling system which may be used prior to the low-or cryogenic-temperature operations in the ultrafreeze apparatus. For this process method, the housing (153) would extend under both the length of the ultrafreeze apparatus and that of the commercially available $CO_2$-cooling unit for traversal of the belt (148) after exiting the ultrafreeze apparatus (100) and traversing back to the entry of the $CO_2$-cooling system. The conveyor frame at or near the entry and exit of the tunnel (102) and freeze space (114) is to be removable or not to interfere with the attachment of the doors (138 and 139), illustrated by FIGS. 8, 9, and 10, when non-conveyor ultrafreeze or freeze-dry methods are used. A section of the conveyor belt will be designed to be disconnected after being used to load materials for stationary ultrafreeze or freeze-dry operations, the section being of sufficient length to allow the attachment of the doors.

FIG. 8 illustrates the construction of door (137 and 139) which consists of concentric, thin-walled aluminum sheets, (137A and 137B), which are screwed and epoxy bonded onto a low thermal-conductivity plastic flange (136). The concentric sheets are formed into cylindrical shapes, radiused at each end, such that when attached to the rectangular flange (136), a 3-inch annular space (136A) is formed. The inner sheet (137A) is multilayered with super insulation material (147), S/I layers as described earlier, at a density of 60 to 75 layers per inch, but for a distance of at least 2 inches. Thin support ribs or spacers (171), fabricated also of G-10 material, are inserted between walls (137A and 137B) to provide additional strength for the door walls.

Stainless-steel tubing (141) extends from the concave (inner) wall (137B), through the annular space 136A, then through the convex (outer) wall (137A), to a vacuum-pressure gauge (142), and then to a variable-pressure valve (143) and pump-line connector (141) in communication with a pressure sensor and solenoid to control pumping pressures (not shown). Vacuum-S/I insulation is provided for the door when the annular space 136A is pumped, via vacuum-evacuation valve (170), to a pressure of $10^{-4}$ torr or lower.

Door (139) is of the same construction as door (138) with the exception of walls (137A) and (137B) having no line (141), gauge (142), or valve (143) assembly attached. Both doors, (138 and 139), when evacuated to pressures of $10^{-4}$ torr or less, can provide good vacuum-S/I heat-insulation and vacuum-pressure capabilities for the tunnel freeze space (114) when attached to the port (111) ends of the tunnel (102).

Holes (140) are drilled through the door flanges (136) to match the studs (135) protruding from the support flanges (131) at port (111), illustrated in FIGS. 4, 5, and 6. The door flanges (136), although of thinner material, are of exact congruence with the port flanges (131), and when placed onto and secured, using wing nuts, tightly against an O-ring (134), the doors provide vacuum-evacuation capabilities, via line (141) adjustable-pressure valve and line assembly (163), for the tunnel (102). When used for freeze-dry applications, the doors also provide greater insulation against external-heat influx as well as variable-pressure control of higher-pressure spray temperatures in the tunnel.

In this manner, the vacuum jacket (163) is insulated by a high vacuum in addition to the heat-reflective multi-layer insulation (S/I) material. The low-pressure vacuum, generally attained with a mechanical and diffusion pump, is created at the fabrication facility by pumping from a vacuum-exhaust vent—not shown in the illustrations—generally to a level of $<10^{-4}$ torr after proper heating and outgassing methods. When 1-atm liquid nitrogen is added to the annular space (110) at 77 K.($-320°$ F.), the colder inner wall (103) of the vacuum jacket (163) acts as a getter or molecular trap, and the vacuum jacket (163) pressure drops to less than $10^{-5}$ torr to provide even greater insulation.

The liquid-coolant ($LN_2$) annulus (110) may be filled with liquid coolant (61) to levels (50) (51), or (52) via fill-valve port (117) for topside filling procedures, or via fill-port (146) for filling from the bottom of the coolant annulus (110). The bottom fill-port (146) may also be used as a liquid-coolant ($LN_2$) drain or transfer port. Both fill-port valves (117A and 146A) are mounted in vacuum-insulated standoffs or consist of double-wall, vacuum-insulated assemblies, the outer walls being attached by welding and essentially comprising standoffs. The respective $LN_2$ levels (50, 51, and 52) designate liquid-coolant levels with level (50) totally encompassing the tunnel (102), but leaving at least 10% ullage space (62). Level (51) designates a coolant level at a height 2–3 inches above the bottom plate (104) of the tunnel (102). Level (52) designates a coolant level in the annulus (110) at 1 to 1.5 inches below the bottom plate (104) and the tunnel sidewalls (106).

A commercially-available pressure-differential transmitter (118), for monitoring and maintaining the $LN_2$-coolant level, entails the use of a pressure-sensor tube (128) below the liquid-level of the coolant (61) and a pressure-sensor tube (129) in the vapor-ullage space (62). The transmitter (118) signals, via electrical line (130), a solenoid-control sensor in the $LN_2$-fill line (not shown) to affect $LN_2$ flow from an external liquid-nitrogen storage tank. The liquid-coolant level may be accurately set to a predetermined level such that when the coolant level drops below a predetermined setting, the solenoid activates the $LN_2$-fill mode. The fill line from the external storage tank always remains attached during the operation of the apparatus and continuously monitors and sustains the proper liquid-coolant level. Other coolant-level maintenance methods, such as a float-control system may be used but the pressure-differential control method is preferred.

Extending from the bottom of the liquid coolant (61) is a liquid-transfer line (186) running upwards through the $LN_2$ and through the vapor-ullage space (62), via head (107), and vacuum-S/I insulation jacket (163) to the vacuum-insulated three-way valve (197) as illustrated by FIGS. 5, 6, and 10, FIG. 10 being a isometric cutaway view through the pressure vessel (101) of the apparatus (100). The line (186) exits valve (197) and passes back through head (107), the liquid-coolant (61), and top (108) of the tunnel (102) to the liquid-coolant dispersion tubes (187) which extend along the length of the tunnel (102) at a height of about one inch below the domed top (108) of the tunnel (102).

Also illustrated by FIGS. 4, 5, and 6 is the vapor-transfer line (188) running from the top of the vapor-ullage space (62) and through head (107) to the vacuum-insulated valve (112) via the vacuum-S/I insulation jacket (163). The vapor-transfer line (188) exits valve (112) and passes back through head (107) into the liquid-coolant annulus, then through the tunnel top (105) to the vapor-dispersion tubes (115) running along the length of the tunnel (102) and also at a height of about one inch below the domed top (105). The path of the vapor-transfer line (188) through the liquid coolant (61) is to be relatively long so that the temperature of the coolant vapor is essentially that of the coolant prior to entering the vapor-dispersion tube (115). Therefore, the transfer line (188) should be concentric to (and can be in contact with) the inner radius of head (107) prior to connecting to the vapor-dispersion tubes (115) via the domed top (105). The dispersion tubes (187) are parallel to each other and form a continuous path with the ends connected by a "U" section or by bending a single long tube into the same configuration to form the liquid-dispersion tube path. The vapor-dispersion tubes (115) are formed in the same manner and are of the same configuration. The "U"-shaped ends of each set of parallel tubes may be bent somewhat to cross over (or under) each other at each end of the tunnel (102). The tubes are supported by hooks (165) which are epoxy bonded to the top of the 40-foot tunnel at 4-foot intervals, and are connected to the liquid-coolant and vapor-transfer lines (186 and 188, respectively) at either the entry or exit end of the tunnel to facilitate removal of the sections when required. The parallel sections are made to be also parallel to the bottom plate and, therefore, extend straight through the ultrafreeze or tunnel space (114) if the tunnel (102) is not sloped or the sections may be bent to remain parallel with the bottom plate if the tunnel (102) is sloped, as illustrated by FIGS. 4, 5, and 6, for low-temperature vapor retention.

The spray tubes may be drilled to provide circular spray ports (generally, 1/32-in. to 1/8-in. diameter) or be connected to adjustable spray nozzles (116) as illustrated in FIGS. 5, 6, and 11. The size and placement of the spray nozzles along the bottom of the tubes will be determined by the quantity of products receiving ultrafreeze processing and the exact ultrafreeze modes used. The upstream cooling efficiency will also affect the size and location of spray ports and nozzles. The tubing-spray system is designed to facilitate removal and accommodation of various spray quantities and applications. An important feature of the spray nozzles is that the spray patterns, of either vapor or liquid coolant, may be varied; also, the nozzles may be closed or opened to allow either no $LN_2$ vapor or liquid spraying, or to provide vapor or liquid spraying for designated sections of the ultrafreeze space as the products are conveyed through the tunnel (102) or to provide various combinations, e.g., $LN_2$ spray, followed by $LN_2$-vapor spray, then followed by no $LN_2$ or vapor spraying of the products along specified intervals of the tunnel. It is probable that different sizes of the tubes, spray ports and nozzles comprising the spray system will be used to accommodate the various-type products and quantities.

Two additional options exist for the spray system. These allow for liquid coolant and vapor supplied from external storage tanks, if required, for very large product quantities, or if greater amounts of converted $LN_2$-to-vapor are required for upstream or downstream usage. Three-way valve (197) may be one in the "Off" position for no $LN_2$ or vapor transmission, two in the "$LN_2$-On" position to allow $LN_2$-coolant transmission to dispersion tube (187) via line (186), or three in the "External-$LN_2$ Open" position to allow entry of $LN_2$, via line (184) and valve (185), from an external storage tank into line (186) for transmission to dispersion tube (187). External vapor may also be provided in a respective manner except that three-way valve (112) is in the "External-Vapor Open" position to allow that vapor from an external storage tank be transmitted via line (182) and valve (183) to line (188) for transfer to vapor-dispersion tube (115).

Line (119) extends from the vapor-ullage space (62), above the coolant (61), through head (107), to valve (121), via vacuum-pressure gauge (120), and then to line (122). For positive-pressure applications, line (122) may be used to transmit converted vapors from the coolant to regions upstream from the apparatus for pre-ultrafreeze product cooling. For this application, line (122) would be vacuum-S/I insulated for minimal heat loss prior to entering the pre-ultrafreeze upstream cooling regions. For negative-pressure applications (for nonconveyor vacuum-freeze methods), line (122) is uninsulated to allow some ambient heating of the cold vapors which may be pumped out of the ullage space (62) to a vacuum pump and sensor (not shown, but will be discussed subsequently). This allows another utilization of the apparatus to directionally freeze products by bottom-plate contact to a frozen coolant ($LN_2$) which can be done when $LN_2$ is pumped over continuously to pressure levels of 0.127 atm (96.4 mm Hg) and lower. Liquid nitrogen freezes at just above 63 K.(−345° F.) at 0.127-atm pressure.

This applicant has utilized frozen-$LN_2$ applications (primarily on metals) for a number of years at temperature ranges of 33 K. to 63.1 K. (−400° F. to −345° F.) obtained by pumping over $LN_2$ to sufficiently low pressures. Line (122), therefore, is connected to a vacuum pump (either mechanical or turbo-molecular) with about 50-cfm pumping-speed capacity and low-pressure capability of about 50 microns (Hg). Not shown is a commercially-available sensor which activates a solenoid to maintain certain pre-set negative-pressure levels.

Low pressures utilized in vacuum-freeze applications necessitate attaching doors (138) and (139) after the products are loaded. Low pressures are created in the tunnel (102) when the annular space (110) is pumped to sufficiently low pressure levels since the tunnel walls (106) contact the lower-temperature or frozen $LN_2$ coolant and are of the same temperature. The colder tunnel-wall temperatures are well below the 1-atm vapor-pressure temperature equivalents of ambient air and thus act as a pump or getter for air molecules. Therefore, the doors must be attached at the ends of the tunnel (102) for low-temperature annular-coolant ($LN_2$) freezing modes in a similar manner required as evacuating the ultrafreeze space by pumping via valve/line assembly (143) on door (138).

Line (123) also extends from the vapor-ullage space (63), through head (107), to the variable-pressure vent valve (126). Connected to the external, vacuum-S/I insulated line (123) are a coolant-ullage rupture-disk assembly (124), coolant-ullage pressure-relief valve (125) and variable-pressure vent valve (126). The pressure-relief valve (125) is designed to open and vent pressures exceeding 10% of the allowed maximum design pressure of the innershell coolant-ullage annulus (110). The rupture-disk assembly (124) is designed to rupture if pressures exceed 20% of the maximum allowed pressure of the inner annulus (110) if the pressure-relief valve (125) has insufficient capacity to prevent overpressure or becomes inoperable. Additional pressure-relief valves and rupture-disk assemblies may be utilized for other regions of the apparatus in adhering to ASME and other Code guidelines as well as at the discretion of the fabricator.

Variable-pressure vent valve (126) may be set at predetermined pressure levels up to the venting-pressure setting of the relief valve (125). The pressure setting of valve (126) plays an important role in the operation of this embodiment of the invention inasmuch as the pressures of the liquid coolant as well as those of the vapors in the ullage space are determined by the preset-pressure levels of valve (126) when all other exit valves for either the nitrogen liquid or vapor are closed. Or, if the liquid-coolant or vapors are dispersed via lines (186) or (188) to dispersion tubes (187) or (115) respectively (by opening valves 107 and 185) at pressures lower than the vent-pressure setting of valve (126), the various pressures for the $LN_2$ (61) or vapor in the ullage space (62) may be controlled by the pressure setting of valve (126).

The pressure level of the coolant (61) indicates the corresponding temperature of the coolant which provides the primary bottom-plate cooling or freezing of products in contact with the plate; the respective temperatures of the $LN_2$ and vapors dispersed via dispersion tubes 187 and 115 are not controlled by the coolant-ullage pressures in annulus 110 when introduced into the tunnel (102), but their spray velocities, and, therefore their cooling masses are. The temperature of the $LN_2$ or vapor spray is determined by the pressure of the tunnel; or, the temperature of the liquid or vapor—if emanating from the coolant (61)—when sprayed onto products being conveyed through the tunnel (102) at 1 atm would be about 77 K.($\approx$−320° F.); or if the variable-pressure valve (143) on door (138) were pre-set to 33 psia (2.25 atm), the temperature of the $LN_2$ spray or vapor would be 85 K.(−306° F.) if the pressure of the tunnel were maintained at 33 psia.

Higher coolant pressures, as may be preset using variable-pressure valve (126), are used in some blast-freezing operations, but primarily to affect higher liquid-or vapor spray velocities for greater heat absorption via the liquid or vapor spraying procedures.

However, in the embodiments of this invention, the commercially-available pressure valve is used to determine the bottom-plate cooling temperature of the liquid coolant to affect and control the primary ultrafreezing mode which is the available liquid-to-vapor conversion of the equivalent heats-of-vaporization of the coolant. Negative (below 1-atm) pressure heats-of-vaporization equivalents may also be controlled by pumping over the liquid to specified pressure levels, as may be indicated by gauge (120), which provides even greater and more rapid cooling or ultrafreeze capabilities. Some typical temperatures, pressures, and heat-of vaporization levels for nitrogen are shown as follows in TABLE III:

| TEMPERATURE | | PRESSURE | | HEAT OF VAPORIZATION |
|---|---|---|---|---|
| (K.) | °F. | ATM | psia | KJ/Kg |
| 60.0 | −351 | .062 | 0.91 | 242.0 (heat of sublimation) |
| 63.15 (freezing point) | −345 | .124 | 1.82 | 220.0 |
| 65.0 | −342 | .174 | 2.56 | 214.0 |
| 70.0 | −333 | .378 | 5.56 | 208.3 |
| 77.3 | −320 | 1.00 | 14.70 | 199.3 |
| 85.0 | −306 | 2.25 | 33.08 | 188.7 |
| 90.0 | −297 | 3.54 | 52.04 | 180.9 |

Therefore, the ability to reduce the pressure of the $LN_2$ coolant to less-than-1 atm (vacuum) levels and attain lower bottom-plate temperatures and greater heat-absorption capability due to the higher heats of vaporization (or sublimation) is made obvious. The higher-pressure levels of the $LN_2$ coolant results in warmer bottom-plate temperatures and lower heats-of-vaporization levels, but higher $LN_2$ and vapor velocities, for greater topside product cooling, but, create less directional cooling of the products and may be more suitable for frangiation purposes than the more directional-cooling methods for high-moisture or fragile food products. The method is still suitable, however, for many food products.

The increased cooling or freezing capabilities for higher-pressure, higher-velocity coolant or vapor spraying onto products, by utilizing variable-pressure control valves, is used in some commercial applications. But such usage for controlling liquid-coolant pressures to below 1-atm (vacuum) pressures resulting in greater bottom-plate ultrafreeze capabilities, or for creating warmer bottom-plate ultrafreeze levels along with higher-mass (higher spray velocities) top-side cooling capabilities has not been made so far as is known; these methods are provided by the invention and are considered innovative.

When used in freeze-dry (or freeze-vacuum) operations, the items are loaded into the tunnel or freeze space (114) via the conveyor belt (148); the loading section of the belt is disconnected and folded over into the freeze space after the doors (138, 139) are attached. All valves are closed with the exception of the variable-pressure valve (126) which is set to the open-pressure level of 0 psig (1 atm). The products may be ultrafrozen by bottom-plate cooling at different temperatures by presetting the variable-pressure valve (126) to the corresponding pressure levels (from TABLE IV) with the excess vapors exited through line (127) to pre-freeze product-cooling or storage areas. The ultrafreeze methods may also include that of the primary bottom-plate mode, but with $LN_2$-vapor spraying, via dispersion-tube (187), or $LN_2$ (liquid) spraying, via dispersion-tube (115); again, the expended vapors are exited via the insulated line (127) to pre-freeze product-cooling or storage areas. After sufficient times for totally freezing the products (but not to the minimum possible temperatures), valve (126) is closed and negative-pressure (vacuum) pumping is begun by opening variable-pressure valve (143), connected to the uninsulated line (171), running to a vacuum pump (not shown). Negative-pressure pumping is not begun until all of the material is below its freezing point since vacuum expansion of unfrozen liquid pockets may damage the products; however, after freezing and pumping begins, the product freezing rates are increased under vacuum due to the decreased pressure in the freezing space or tunnel (102) since the equivalent energy removal is essentially the product's frozen liquidous-vapor volume multiplied by the pressure reduction of the product. So freezing actually occurs more rapidly under vacuum with the increased cooling by forced sublimation.

After freezing to minimum temperatures under vacuum, resulting in more-rapid freezing rates, the products may be placed into another commercially-available vacuum chamber (not shown). This is done because the cold bottom plate of the ultrafreeze apparatus creates sufficiently low vapor-pressure equivalents that continued drying or dehydration would require very long pumping times. The small frozen-cell formations formed in the ultrafreeze apparatus should assure enhanced texture and palatability because of reduced large ice-cell damage of food products. When placed into the second vacuum apparatus (not shown), the products are heated, at low temperatures, while under vacuum at pressures of about 50 to 500 microns (Hg). So long as the vacuum pressure does not exceed 4.7 mm Hg, the frozen water from the small-cell ice crystals sublimes without re-liquidizing.

Another vacuum method, previously mentioned, entails pumping from the $LN_2$ vapor ullage space; this may be done by connecting line (127) to the vacuum pump (not shown). Other ullage-space exits, such as line (122) (via valve 121) or even fill-port (117) so long as a variable-negative-pressure valve and gauge are attached, may be connected to the vacuum pump for attaining low pressures for the $LN_2$-coolant and ullage annulus (110). After the products are loaded, in the same manner as for vacuum-freeze operations, the doors are attached while all exit valves are closed, including those of the dispersion-tube lines (valves 197 and 185) with the exception of valve (121) [if line (122) is not used for pump connections]. During the initial rigorous boiling of the coolant (61), the exit vapors are again conducted to pre-product freezing or storage areas. The low-pressure levels corresponding to the desired lower-than-1-atm temperatures of the coolant may be maintained by the variable-pressure valve (127) sensor connected to the vacuum pump (not illustrated).

Figure 12:
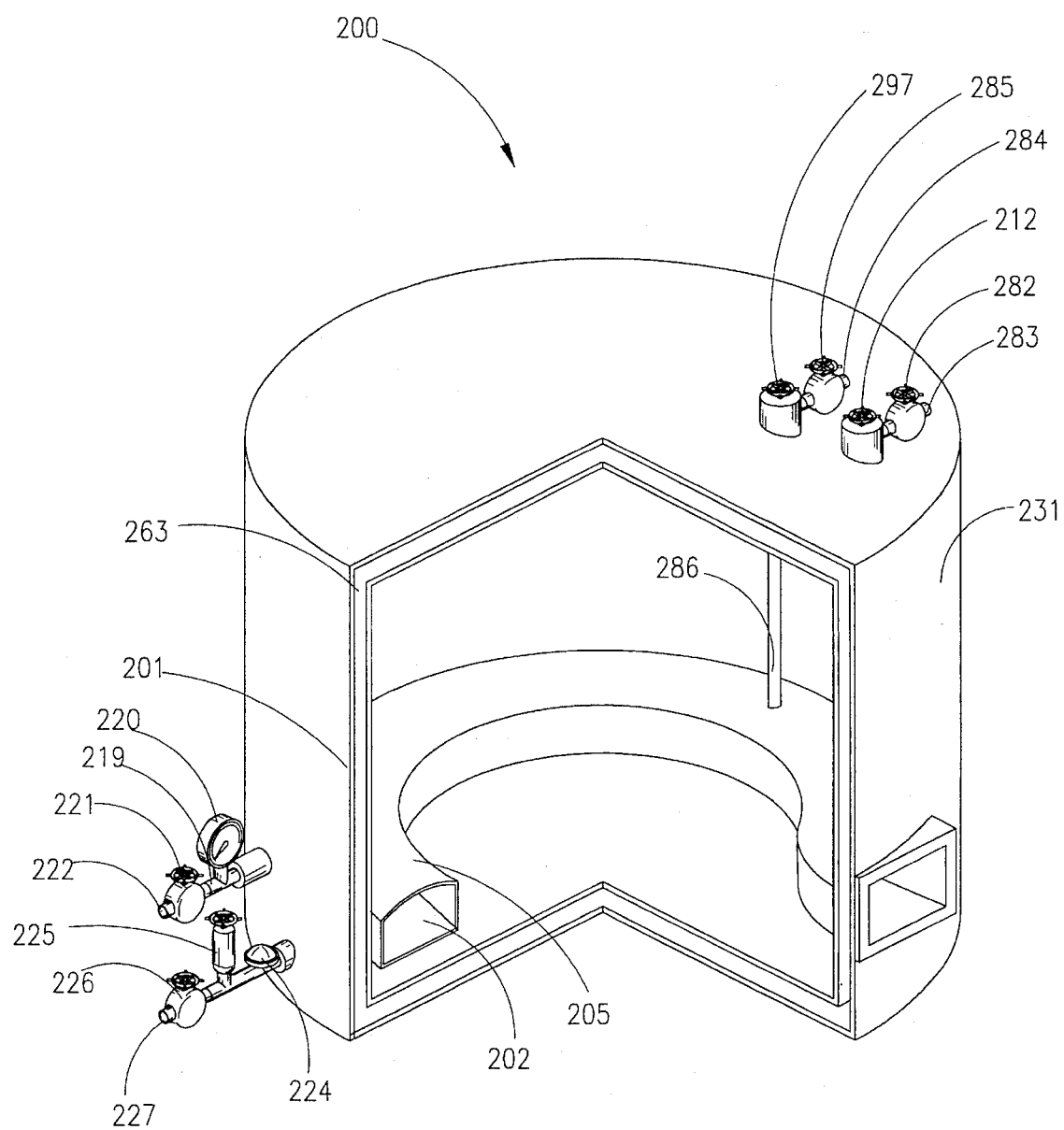
FIG. 12 is an isometric view of the second preferred embodiment having a cylindrical container and a circular tunnel.

The first preferred embodiment of the invention just described and illustrated by FIGS. 4, 5, and 6 offers more use options than the second-, third-, fourth-embodiment configurations illustrated respectively by FIGS. 10, 11 and 12.

The first embodiment has a coolant-containment annular space (110) of 1305 cubic feet (9765 gallons) less 10% for ullage. Although this is a sufficiently large volume to preclude frequent filling of coolant-storage tanks or stations, it does not offer the larger coolant capacities of the second and third embodiments. Also, since the first embodiment is a horizontal, cylindrical apparatus, the vertical designs of embodiments two and three offer more efficient area utilization than the first preferred embodiment. Very importantly, both latter embodiments may preclude the need for expensive coolant-storage stations.

Figure 13:
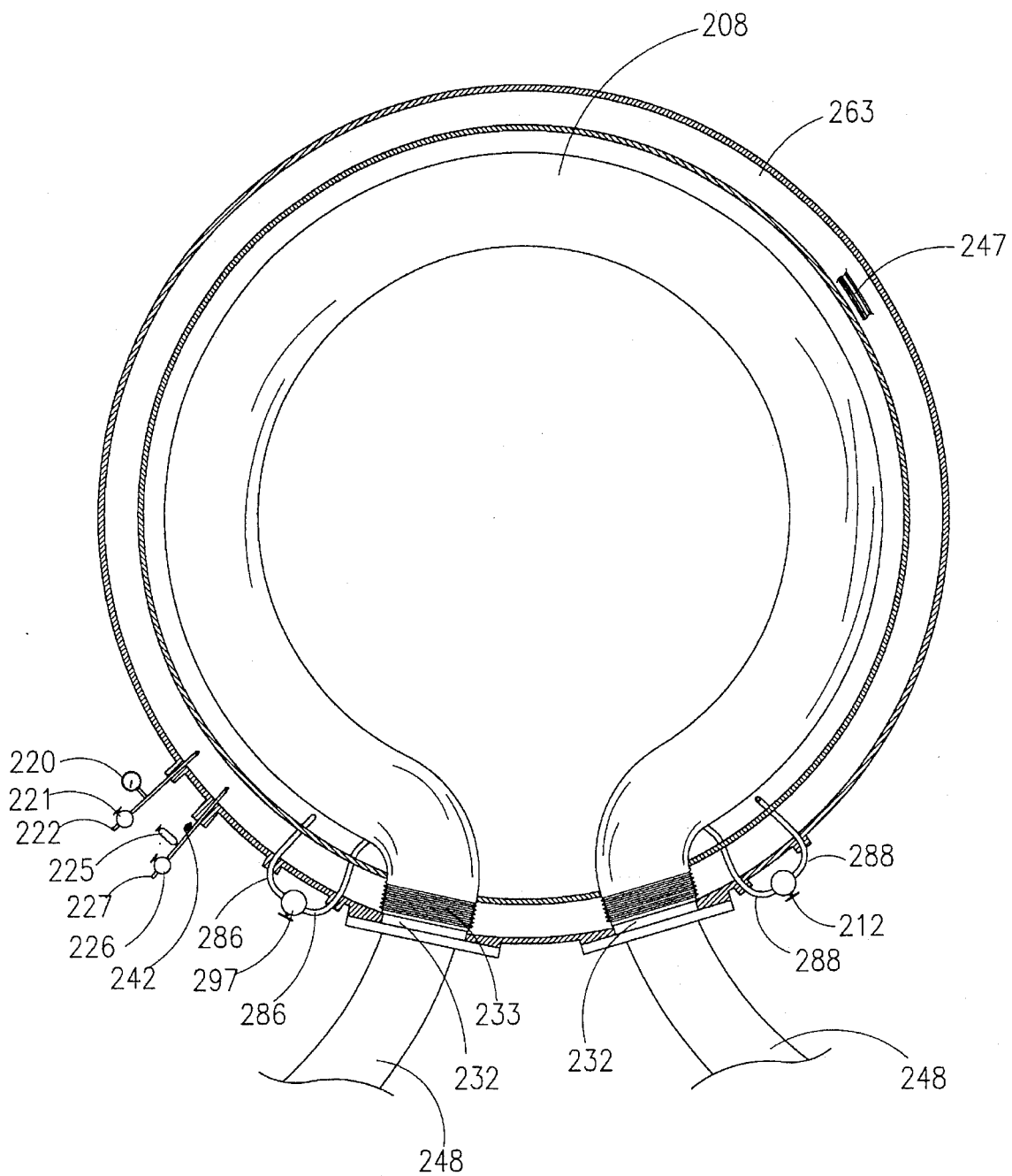
FIG. 13 is downward cross-sectional view of the embodiment of FIG. 13 showing the circular tunnel.
Figure 14:
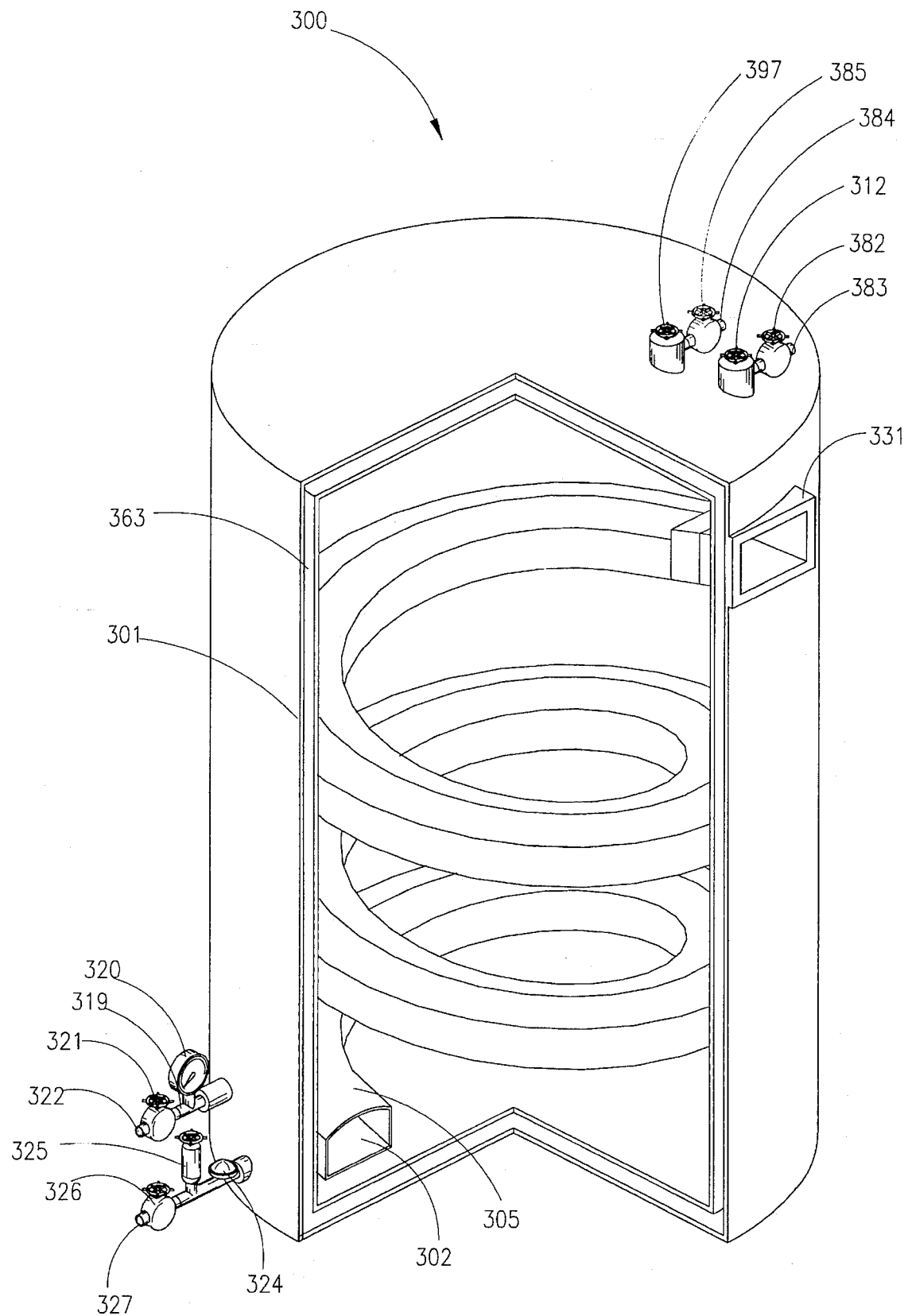
FIG. 14 is a breakaway isometric view of the third preferred embodiment having a cylindrical container and a spiral tunnel.

As illustrated by FIGS. 13 and 14, the second embodiment consists of a vertical, vacuum-S/I-insulated liquid-coolant tank, the bottom of which contains a chamber in the shape of a circular tunnel or freeze space. Whereas the first preferred embodiment of the invention offers three liquid coolant-containment modes, only one is offered in the second embodiment—that of Containment—Mode II, liquid coolant ($LN_2$) completely encompassing the circular tunnel. However, when filled to capacity (allowing 10% ullage), the much larger liquid-containment capacity of the vertical apparatus (which initially may be 50,000 to 100,000 gallons) with the circular tunnel freeze space at its bottom portion may virtually eliminate the $LN_2$-station requirement since the coolant capacity of the ultrafreeze system may be as much as that of a high-volume station.

The third preferred embodiment, as illustrated in FIG. 14, is that of a chamber in the shape of a spiraled-tunnel configuration which enables a longer ultrafreeze path than embodiment one or two without entailing large-space requirements. Although the apparatus would require more frequent $LN_2$ filling than the second embodiment of equivalent size, it could still be of sufficiently large volume to preclude the need for a coolant-storage station.

Both embodiments utilize similar design modes as those of the first preferred embodiment, but some of the various methods available for the first embodiment are not feasible. For example, the large coolant volumes of the second and third embodiments proscribe the lower-level coolant-containment modes available in the first-embodiment apparatus. Coolant levels lower than those which encompass the circular tunnel or the spiral tunnel of the second and third embodiments, respectively, diminish the prime design advantage of both, namely, sufficiently large coolant volumes to preclude frequent fill procedures and the requirement for coolant-storage stations. Also, the large coolant volumes in the annular regions around the circular or spiral tunnels make more difficult the capability of pumping the coolant-ullage regions to negative-pressure levels for lower bottom-plate temperatures. The higher-pressure, warmer bottom-plate temperatures are, however, available as are the vacuum-freeze methods for low-pressure (vacuum) attainment in the tunnel or ultrafreeze regions of the second and third embodiments. Both embodiments also will accommodate conveyor operations since circular and spiral conveyor systems are commercially available. Both embodiments are also adaptive to pre-ultrafreeze cooling methods such as $CO_2$ cooling prior to ultrafreeze operations.

Figure 15:
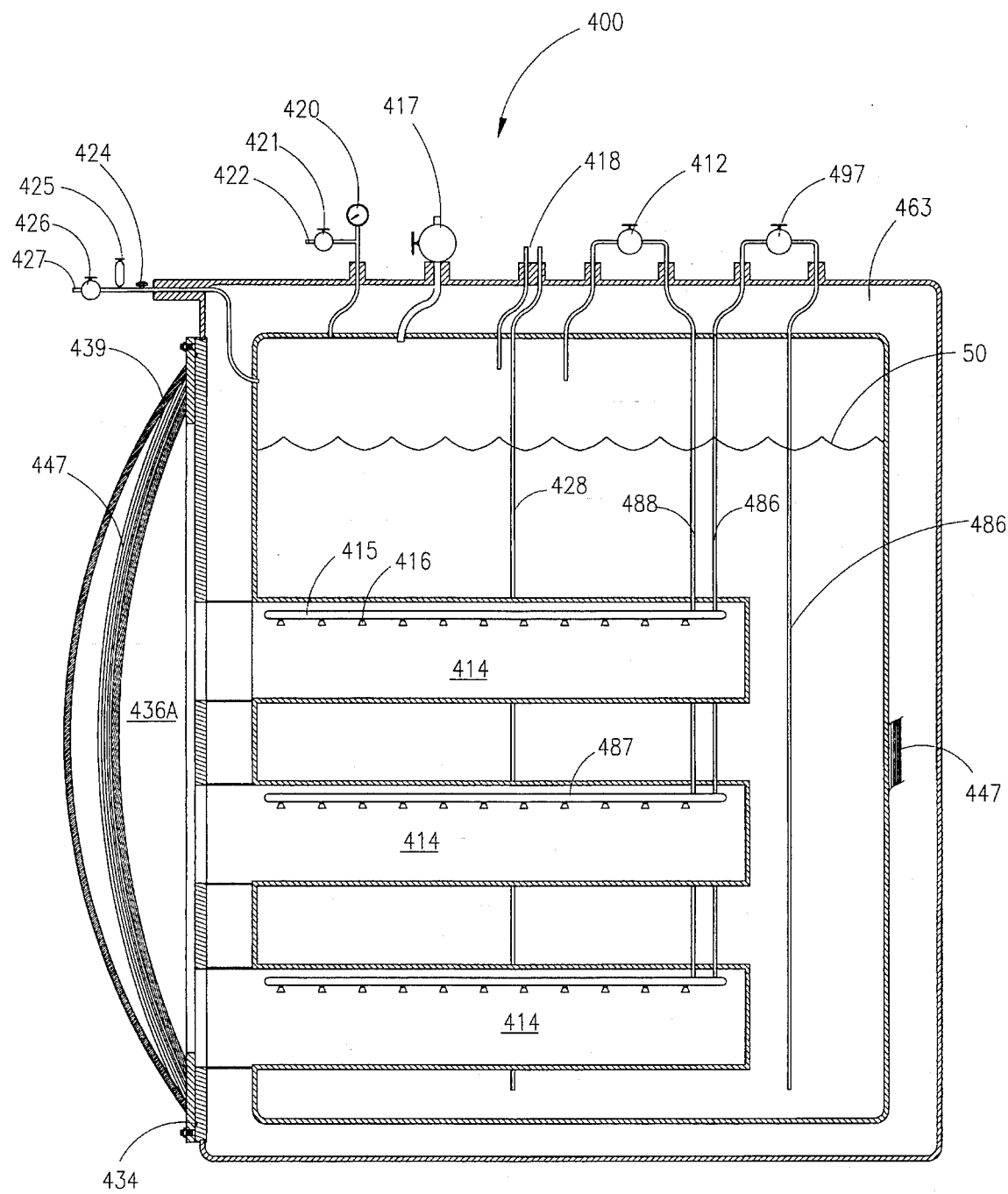
FIG. 15 is a cross-sectional view of the fourth preferred embodiment showing shelves.

The fourth embodiment of the invention is that of a smaller, lower-volume ultrafreeze apparatus illustrated by FIG. 15. It is comprised of multiple chambers which are hollow shelves in communication with $LN_2$-containment spaces at the bottom, sides, back, and top of a rectangular apparatus with radiused corners or bends. The attached door is vacuum-S/I insulated, as in the first embodiment, with dispersion tubes above the top of each freezing shelf to allow $LN_2$ or vapor spraying and bottom-plate cooling of materials. It is intended to be primarily of use in ultrafreezing food products for long-term frozen storage and does not accommodate conveyor operations; it may obviously be of use in directional freezing of other products or materials for tests or other purposes. The fourth embodiment offers essentially the capabilities of the first embodiment, i.e., low-pressure (below-1-atm), lower-temperature bottom-plate (shelf) cooling (low-pressure coolant by vacuum-pump methods), 1-atm (or higher-pressure) bottom-plate (shelf) methods, with or without coolant-liquid or vapor spraying. However, the option of the liquid level below a bottom plate is not offered as in the first embodiment.

In describing the second, third, and fourth embodiments of the invention, corresponding numerical designations are used for indicating components of similar functions to those of the first preferred embodiment. While different in configuration, similar design purposes exist; for example, the designation (105), illustrated by FIGS. 4, 5, and 6 for the first preferred embodiment, indicates the outer shell of the vacuum-S/I jacket for the first preferred embodiment; (405) designates the outer wall of the fourth embodiment illustrated by FIG. 15. The first digit of each numerical designation shown in the illustrations refer to the respective number of the preferred embodiments for example, the designations 147, 247, 347, and 447 refer to the super-insulation (S/I) material around the inner walls of the respective embodiments one through four; likewise, 116, 216, 316, and 416 refer to the spray nozzles of preferred embodiments one through four, respectively. The second and third embodiments also require center shells (203 and 303) respectively, as well as outer shells (205 and 305) to which are welded heads (207 and 307) and (209 and 309) respectively, at each entrance and exit. The same door configurations (138, 139), expansion-joints (133) and attached G-10 plastic-insulation sheets (132) and flanges (131) are used with appropriate numerical embodiment designations. These will be ASME coded for 50-psia in the $LN_2$ containment space of the second and third embodiments. The tunnel dimensions of the second and third embodiments are the same, initially, as those of the first. The door configurations (138, 139) are the same as are the dispersion-tubes (187, 115) and S/I-insulation (147) requirements, again with corresponding numerical designations.

All valves, gauge connections, lines, or tubing and other components used in the apparatus for interconnections, measurements, and control functions are to be of 304 or 316 stainless steel, or equivalent—unless otherwise specified. All external lines, e.g., $LN_2$-fill or refill lines, and vapor lines from external storage tanks (not shown in the illustrations) are to be of double-walled, vacuum-S/I construction; vacuum-exhaust lines extending from the vacuum-S/I jacket (63), the coolant ($LN_2$)-ullage space (61, 62), and the tunnel or ultrafreeze space (64)—when vacuum-freeze methods are used with doors (138) and (139) attached—are not to be insulated.

Except where specifically designated, other than shapes and coolant-containment modes, the component requirements for all four preferred embodiments are the same. The numerical designations of the major components are identical for the different embodiments. The illustrations for the second, third, and fourth embodiments are not presented in the same detail as the first preferred embodiment. Importantly, it should be noted that all embodiments offer as the primary cooling or ultrafreeze modes that of the heat-of-vaporization equivalent of the $LN_2$ coolant. The converted vapors are available for additional ultrafreeze-space cooling by $LN_2$-or vapor-spray methods and then to be used for subsequent upstream cooling before or after materials enter or leave the apparatus.

So in summarizing the original objects of the invention and the apparatus comprising the first four embodiments of the present invention, it is shown that by utilizing the latent heats-of-vaporization equivalents of the low-temperature or cryogenic coolant ($LN_2$) at various pressure levels, the primary cooling or ultrafreeze modes are those of the coolant at lower-than-atm pressures for lower temperatures and greater directional heat-absorption capability from the bottom-to-top portions of the products; or higher-than-1 atm pressures for warmer bottom-portion temperatures and less directional heat absorption, but with higher-velocity $LN_2$ or vapor spray for greater topside cooling capability.

For relatively short freezing times, the temperature of various products may be frozen to essentially the 1-atm temperature of the coolant, and lower when less than 1-atm coolant temperatures are obtained by low-pressure techniques resulting in even more rapid ultrafreeze times because of the greater-temperature differential (from the top to bottom of the product) and higher heats-of-vaporization levels for lower-than-atm pressures of the coolant. These factors contribute to smaller-ice or crystalline-cell formation to minimize larger-size crystal damage to cellular, muscle, fat; or other tissue walls, especially for food products, and may be applicable for freezing biological specimens and other organic materials for long-term (or short-term) frozen storage. These procedures have been carried out with minimal product breakage (except for one tomato) or fracturing of the test products, even when the initial product temperatures were warmer [300 K. (80° F.)] than normal initial product temperatures for most existing commercial-freezing systems.

It has also been shown that even more rapid temperature-reduction modes can be created by spraying the coolant's liquid-to-vapor equivalents of heats-of-vaporization levels, through dispersion tubes, onto the products. The same vapor equivalents may be used to impel liquid coolant through dispersion tubes to affect liquid spraying of the products. These techniques are shown to be suitable for material frangiation as well as for food products with no breakage or fracturing.

Also shown are methods to affect vacuum-freezing (or dehydration) of products by essentially utilizing the ultrafreeze methods for stationary cooling and then to create high vacuum levels for subliming the frozen-ice or crystalline cells. This may be performed by creating low pressures in the tunnel directly by a vacuum pump, or by low-pressure pumping of the annular coolant and ullage space to allow gettering by the tunnel walls contiguous to the lower-temperature $LN_2$ coolant, at less than 1-atm pressure, while simultaneously creating lower-temperature bottom-plate cooling.

The efficiency of the first preferred embodiment is definitely enhanced by utilizing as the primary cooling modes the heat-absorption equivalents of the heats-of-vaporization levels of the $LN_2$ coolant; very importantly also is that large amounts of coolant are not required for re-cooling the tunnel region and contiguous components if not in constant use; the apparatus is better insulated than most cryogenic-storage tanks or stations, and the refill frequencies and coolant usage for initial cool-downs are minimal especially when the tunnel doors are attached if the apparatus is not in use. The storage-or station-refill frequencies are also reduced by the large-volume capacity of the coolant annulus; this should be especially noticeable for the second and third preferred embodiments which are essentially very efficient, large-volume vertical storage stations with the ultrafreeze tunnels near the bottom of a highly efficient storage-station equivalent for the second preferred embodiment, utilizing a circular ultrafreeze tunnel. The spiral-tunnel configuration of the third preferred embodiment is also at the lower portion of the $LN_2$ holding space and encompassed completely by the high-volume coolant. Both embodiments may preclude the need for coolant-storage stations and high-frequency filling operations which should reduce coolant costs for the freezing operations.

Another object of the invention to minimize $LN_2$ (or other liquid-coolant) cost and usage has been demonstrated by the utilization of $CO_2$ which is less expensive per BTU and has greater cooling capabilities to 195 K.(−109° F.) when used as a pre-ultrafreeze cooling method; this also allows more-rapid traversal through the freezing tunnels by the materials to attain necessary cryogenic-or low-temperature levels and, therefore, increased rates of ultrafreeze procedures for increased-volume output.

Thus, the embodiments of the present invention provide unique apparatus and methods of cooling materials to low-or cryogenic-temperature levels for frangiation purposes or long-term frozen storage of food products. The methods comprise a primary freezing mode utilizing the heats-of-vaporization equivalents of the liquid coolant in absorbing heat from the materials at higher or lower pressures for higher or lower temperatures of the liquid coolant for bottom-to-top directional cooling. The created vapors are used for liquid or vapor spraying of the materials in the freezing space for less directional cooling and for external cooling of materials prior to entering or after exiting the apparatus. Liquid nitrogen was the coolant used in the initial tests and in presenting various cooling options for the apparatus; however, the use of other low-temperature or cryogenic coolants is not precluded if the same principles apply. Also, some of the various spraying methods are provided to address different freezing modes preferred by various processors of materials for reclamation or long-term frozen storage. For example, some prefer liquid spraying, for short times immediately upon entering the freezing space, followed by vapor spraying. Others prefer vapor spraying followed by a final liquid-spray procedure. Certain of the presented claims do not apply to all of the preferred embodiments, and those which do not will be so designated.

Rapid temperature-reduction rates to lower-temperature or cryogenic-temperature levels if desired may be achieved in freezing chambers utilizing for example, liquid nitrogen ($LN_2$), or other liquid cryogens or coolants. Liquid carbon dioxide ($LCO_2$) used to create dry-ice snow is an excellent coolant for rapid temperature-reduction rates, but may be used efficiently only to −109° F. Vapors and $CO_2$ snow emanating from such coolant fluids may be and are used in many commercial systems.

With low-temperature reduction around the outer surface of the article being frozen, fracturing, rupturing, or breakage of the product or item may occur even though small ice-crystals are formed. This may be prevented by cooling at slower rates, but such low rates may result in large ice-crystal formation. Therefore, much care must be exercised for optimum control in preventing large ice-crystal formations as well as prevention fracturing, rupturing, or breakage. These problems are especially prevalent in freezing food products such as crabs, crawfish, prawns, tomatoes, oranges, strawberries, and may occur on animal or human tissues and organs which may be frozen and stored for long-term purposes. The moisture or juice content of some of the aforementioned items may well exceed greater than 90% which further contributes to the formation of large ice crystals and fracturing, rupturing, or breakage of the items.

Food products such as crawfish and blue crab, and other shellfish, crustaceans and fish products, that may be pre-cooked or blanched before ultrafreezing prior to frozen storage, should be prepared in as nearly bacteria free conditions as possible. Procedures to eliminate existing bacteria should also be met such as cleaning and rinsing prior to cooking or blanching. Following these steps, chilling in bacteria-free water or other solutions to as low above-freezing temperatures as possible (preferably 32.5° F.) prior to ultrafreeze operations should be performed. Other non-cooked or blanched items such as meats, fruits, and vegetable products should be bacteria free and also chilled to low above-freezing temperatures prior to draining and ultrafreeze operations. The food items should enter the tunnel for deep-freeze operations as rapidly as possible after chilling and draining to both assure more efficient ultrafreeze operations as well as bacteria-free conditions.

Rubber, plastic, and other non-food items to receive ultrafreeze procedures should also be cleaned or rinsed to assure that undesired materials such as dirt and mud on tires, for example, and other foreign debris do not enter the tunnel before ultrafreeze operations. The materials should also be cut or chopped into small sections, as required, for subsequent operations, and chilled to or kept at as low temperatures as is economically feasible prior to ultrafreeze operations. The speed for pre-ultrafreeze operations is not as critical as for food products other than required for lower, pre-freeze temperature before ultrafreeze operations.

While preferred embodiments of the present invention have been disclosed, the intended spirit and scope of the invention is not limited solely by the appended claims since numerous modifications and applications of the disclosed embodiments may occur to those skilled in these and other related arts.

I claim:

1. An apparatus for cooling or freezing materials to low- and cryogenic-temperature levels comprising;
    a) an external source of low-temperature or cryogenic-liquid coolant;
    b) a closed insulated container;
    c) a tunnel having a flat bottom, sides and a top within said container and entry and exit ends through said container, said tunnel being situated within said container so as to form an annulus having a lower liquid-containment space and an upper vapor-ullage space around said tunnel between said container and said tunnel;
    d) means for introducing said liquid coolant into said annulus of said container to fill said liquid-containment space to pre-determined levels around said tunnel;
    e) a means of entry through said entry end into said tunnel for positioning said materials into close proximity with said flat bottom of said tunnel so as to allow gradient bottom-to-top heat absorption from said materials by said liquid coolant through said flat bottom of said tunnel for primary cooling of said materials to low-temperature or cryogenic-temperature levels;
    f) a means of exit from said tunnel through said exit end to remove said materials; and
    g) a means for directing coolant vapors collected in said vapor-ullage space into said tunnel over said materials to provide additional cooling of said materials or to material cooling areas external to said tunnel.

2. An apparatus as recited in claim 1, further comprising;
    a means for directing a portion of said liquid coolant in said liquid-containment space into said tunnel over said materials to provide additional cooling of said materials.

3. An apparatus as recited in claim 1, wherein said means for directing said coolant vapors from said vapor-ullage space into said tunnel over said materials includes a vapor-dispersion tube and spray nozzles.

4. An apparatus as recited in claim 2, wherein said means for directing a portion of said coolant in said liquid-containment space into said liquid tunnel over said materials includes utilizing the pressure in the vapor-ullage space to force said liquid coolant into transfer lines penetrating said tunnel, said transfer lines connecting to liquid-dispersion tubes and spray nozzles extending over the length of said tunnel.

5. An apparatus as recited in claim 4, further comprising means to collect and direct expended coolant vapors from said tunnel to material cooling areas external to said apparatus.

6. An apparatus as recited in claim 5, furthering comprising;
   a) an insulated region around said container to minimize the introduction of external heat into said container; and
   b) low-thermal conductivity flanges around said entrance and exit ends of said tunnel and between said container and said tunnel.

7. An apparatus as recited in claim 6, wherein said means for introducing said liquid coolant into said annulus to predetermined levels includes the range of levels from just below said flat bottom of said tunnel to above said top of said tunnel so as to completely encompass said tunnel with said coolant.

8. An apparatus as recited in claim 7 wherein said level of said liquid coolant in said annulus above said tunnel provides a vapor-ullage space above said top of said tunnel of at least 10 percent of the annulus volume.

9. An apparatus as recited in claim 8, furthering comprising;
   a) means for continuously replenishing liquid coolant levels in said annulus, and
   b) means to control the pressure within said annulus to attain selected positive and negative pressures so as to affect the temperature and heat-of-vaporization of said liquid coolant within said annulus, the temperature of the coolant vapor in said vapor-ullage space, and the velocity of and coolant mass of vapors from said vapor-ullage space.

10. An apparatus as recited in claim 9, further comprising;
    a) a belt-type conveyor means to convey materials through said tunnel along its length;
    b) means to vary the speed of said conveyor;
    c) means to control the flow of liquid coolant from said liquid-spray nozzles and from said vapor-spray nozzles along selected segments of the length of said tunnel so as to create selected modes of liquid spray, vapor spray or non-spray; and
    d) an external low-temperature or cryogenic-liquid coolant tank, said tank having a tank liquid-coolant space and a tank vapor-coolant collecting space, said tank further comprising a means for directing said tank vapor coolant from said tank to said vapor-dispersion tubes and a means for directing said tank liquid from said tank to said liquid dispersion tubes.

11. An apparatus as recited in claim 10, further comprising a means for retaining colder, higher-density coolant vapors within said tunnel.

12. An apparatus as recited in claim 11, wherein said means for retaining said colder, higher-density coolant vapors within said tunnel includes a downwardly sloped section of said tunnel at the entrance end of said tunnel and an upwardly sloped section of said tunnel at the exit end of said tunnel.

13. An apparatus as recited in claim 12, further comprising;
    a) attachable insulated doors at said entry end and said exit end of said tunnel;
    b) means for detaching said belt-type conveyor to allow for closing said tunnel at each end with said attachable doors;
    c) means for directing expended coolant vapors through said doors to external cooling areas; and
    d) means for reattaching said belt-type conveyor.

14. An apparatus as recited in claim 13, wherein;
    a) said means for directing expended coolant vapors through said doors includes an insulated line from said tunnel through said doors, flow from said line being controlled by a valve.

15. An apparatus as recited in claim 13, further comprising;
    a) means for vacuum sealing said doors at said entry and exit ends of said tunnel; and
    b) means for attaining negative pressures within said tunnel.

16. An apparatus as recited in claim 15, wherein said means for attaining negative pressures within said tunnel includes an uninsulated conduit from said tunnel through said doors to a vacuum pump.

17. An apparatus as recited in claim 16, wherein;
    said tunnel is horizontally configured; and said container is comprised of a horizontal inner shell around said tunnel, said inner shell being mounted to and around said tunnel, said inner shell and said tunnel creating said annulus, and a horizontal outer shell, said inner shell and said outer shell forming a vacuum space around said inner shell.

18. An apparatus as recited in claim 17 wherein said tunnel entry end and said exit end have flexible flaps for reducing heat exchange to the tunnel.

19. An apparatus as recited in claim 17 wherein the outside of said inner shell is wrapped with heat-reflective, multi-layer insulation.

20. An apparatus as recited in claim 16, wherein;
    said container is comprised of a vertical, cylindrical inner shell to contain said liquid coolant and a vertical, cylindrical outer shell, said inner shell and said outer shell forming a vacuum space around said inner shell; and said tunnel is circularly configured parallel to the bottom of said cylindrical shell so as to allow a range of predetermined coolant levels extending from said flat bottom of said tunnel to over said top of said tunnel within said inner shell, said tunnel having an entry end and exit end penetrating said inner and outer container shells.

21. An apparatus as recited in claim 20 wherein the outside of said inner shell is wrapped with heat-reflective, multi-layer insulation.

22. An apparatus as recited in claim 21 wherein said container is of sufficient height, diameter and volume to retain sufficient liquid coolant to completely encompass said tunnel and to provide sufficient liquid coolant storage to preclude the necessity of frequent refilling.

23. An apparatus as recited in claim 16, wherein;
    said container is comprised of a vertical, cylindrical inner shell to contain said liquid coolant and a vertical, cylindrical outer shell, said inner shell and said outer shell forming a vacuum space around said inner shell; and said tunnel is spirally configured with an entry end at the bottom of said container and an exit end at a higher level of said container, said coolant level within said container extending over said higher level of said tunnel within said inner shell.

24. An apparatus as recited in claim 23 wherein the outside of said inner shell is wrapped with heat-reflective, multi-layer insulation.

25. An apparatus as recited in claim 24 wherein said entry end of said spiral tunnel is at a higher level of said container and the exit end of said spiral tunnel is at the bottom of said container.

26. An apparatus for cooling or freezing materials to low- and cryogenic-temperature levels comprising;
   a) an external source of low-temperature or cryogenic liquid coolant;
   b) a closed insulated container;
   c) a plurality of hollow shelves within said container, said hollow shelves forming a plurality of flat-bottomed cooling chambers and forming a closed coolant-containment space around said cooling chambers;
   d) means for introducing said liquid coolant into said container to fill said coolant-containment space around said compartments; and
   e) a plurality of insulated entry doors providing access into said compartments for positioning said materials into close proximity with said flat bottoms of said compartments so as to allow gradient bottom-to-top heat absorption from said materials by said coolant through said flat bottoms of said compartments for primary cooling of said materials to low-temperature or cryogenic-temperature levels.

27. A method for cooling materials to low or cryogenic temperatures comprising the steps of;
   a) placing the material into a tunnel consisting of a flat-bottom plate, sides, and top wherein said top, bottom and sides of said tunnel are contiguous to a heat-insulated coolant-containment space containing a pre-determined level of liquid low-temperature or cryogenic coolant;
   b) cooling said materials by utilizing directional bottom-to-top heat absorption from said materials by heat conduction to said coolant through said bottom plate contiguous to said coolant for primary cooling;
   c) controlling the pressure of said coolant to provide primary directional or gradient bottom-plate temperatures;
   d) controlling the level of said coolant below said bottom plate of said tunnel to provide primary directional or gradient bottom-plate temperatures;
   e) collecting vapors produced from liquid-to-vapor conversion by said coolant's heat-of-vaporization equivalents during primary cooling of said material by heat absorption from said material through said bottom plate to said liquid coolant in a ullage space above the liquid-coolant level in said coolant-containment space; and
   f) directing said coolant vapors collected in said vapor-ullage space into said tunnel over said materials to provide additional cooling of said materials or to material cooling areas external to said tunnel.

28. The method as recited in claim 27 further comprising the steps of:
   a) providing a level of low-temperature or cryogenic-liquid coolant to encompass said tunnel;
   b) providing a minimum ullage space having a volume of ten percent of said liquid-containment space above said liquid-coolant level;
   c) maintaining a pre-load coolant-pressure level of 1 atm by directing vapors of greater than 1-atm pressure created in said ullage space from external heat in-flow to external material-cooling areas;
   d) placing said materials into said tunnel;
   e) closing said tunnel;
   f) cooling said materials to the desired low- or cryogenic-temperature levels for pre-determined time periods; and
   g) directing the vapors generated by the material-heat loss creating the liquid coolant's 1-atm heat-of-vaporization equivalents to external material-cooling areas to provide primary directional bottom-to-top cooling of said materials.

29. The method as recited in claim 28 wherein said tunnel is left open, further comprising:
   the step of conveying said materials through said open tunnel at pre-determined speeds for attaining pre-determined cooling times.

30. The method as recited in claim 27 wherein the vapors generated by said liquid coolant's heat-of-vaporization equivalents are directed through dispersion-spray tubes back onto said materials in said tunnel simultaneously as primary bottom-plate cooling occurs to provide less-directional cooling as the upper portions of said material are cooled by the generated vapors, including the additional steps of:
   a) directing expended coolant from said tunnel to external material-cooling areas; and
   b) using the pressure created by the vapors in said ullage space generated from said liquid coolant to impel liquid coolant through liquid-dispersion spray tubes onto said materials in said tunnel.

31. The methods as recited in claim 28 wherein, as bottom-plate 1-atm temperature cooling occurs in a closed system, alternate liquid-, vapor-, or non-spray cooling modes are provided for specified time intervals as bottom-plate materials cooling occurs while directing expended coolant vapors from said tunnel to external material-cooling areas.

32. The methods as recited in claim 29 wherein as bottom-plate, 1-atm temperature cooling occurs in an open system during material conveyance, alternate pre-determined liquid-, vapor-, or non-spray cooling modes are provided for said materials conveyed through said tunnel as bottom-plate materials cooling occurs while directing expended coolant vapors from said tunnel to external material-cooling areas.

33. The method recited in claim 31 wherein the pre-load pressure of said low-temperature or cryogenic coolant is maintained at greater than 1-atm pressure levels.

34. The method recited in claim 32 wherein the pre-load pressure of said low-temperature or cryogenic coolant is maintained at greater than 1-atm pressure levels.

35. The method as recited in claim 28 wherein the liquid coolant is maintained at levels even with or just above that of said bottom plate of said tunnel so as to provide coolant-vapor contact with said sides and top of said tunnel so as to create less radiant-heat absorption from said materials than that produced by coolant liquid contacting the sides and top of the freeze space or tunnel providing greater directional or gradient cooling of materials to low or cryogenic temperatures.

36. The method as recited in claim 35 wherein the pre-load coolant pressure is maintained at pressures greater than 1 atm so as to provide warmer bottom-plate cooling temperatures of said materials created by the greater than 1-atm pressures of said coolant's liquid and vapor phase and a lower radiant-heat absorption level for said materials by the sides and top of said tunnel.

37. The method as recited in claim 28 wherein the liquid-coolant level is below said bottom plate of said tunnel so as to provide lower primary materials-cooling by bottom-plate heat conduction through the vapors generated below said bottom plate, lower-temperature radiant-heat absorption from the materials by the sides and top of the freeze space or tunnel, and less vapor availability for cooling at external material-cooling areas than when the liquid-coolant is above said bottom plate.

38. The method as recited in claim 27 wherein the coolant-containment space around said tunnel, initially at 1-atm pressure, is connected to a vacuum pump further comprising the additional steps of:

a) providing vacuum-insulated doors;

b) sealing said tunnel with said doors thus closing said tunnel;

c) providing communication between said ullage space through an uninsulated line to a vacuum pump;

d) allowing the initial pressure surge created by the vapors generated by the bottom-plate heat absorption from said materials to reach levels not exceeding the evacuation capability of said vacuum pump; and e) pumping said vapors from said ullage space over the level of said liquid coolant in said coolant-containment space.

39. The method as recited in claim 27 wherein said tunnel is connected to a vacuum pump further comprising the steps of:

a) loading materials containing aqueous fluids into said tunnel;

b) attaching and sealing vacuum-insulated doors to said tunnel thus closing said tunnel;

c) directing vapors generated by bottom-plate directional cooling to external material-cooling areas;

d) pumping said tunnel to low-pressure levels as simultaneous bottom-plate directional freezing occurs so as to provide additional cooling of said materials by vapor-expansion of said aqueous fluids of said materials and partial dehydration of said materials prior to subsequent external vacuum-freeze operations on said materials.

40. The method as recited in claim 29 wherein the liquid-coolant is maintained at levels even with or just above that of said bottom plate of said tunnel so as to provide coolant-vapor contact with said sides and top of said tunnel so as to create less radiant-heat absorption from said materials than that produced by coolant liquid contacting the sides and top of the freeze space or tunnel to provide greater directional or gradient cooling of materials to low or cryogenic temperatures.

41. The method as recited in claim 40 wherein the pre-load coolant pressure is maintained at pressures greater than 1 atm so as to provide warmer bottom-plate cooling temperatures of said materials created by the greater than 1-atm pressures of said coolant's liquid and vapor phase and a lower radiant-heat absorption level for said materials by the sides and top of said tunnel.

42. The method as recited in claim 41 wherein the liquid-coolant level is below said bottom plate of said tunnel so as to provide lower primary materials-cooling by bottom-plate heat conduction through the vapors generated below said bottom plate, lower-temperature radiant-heat absorption from the materials by the sides and top of the freeze space or tunnel, and less vapor availability for cooling at external material-cooling areas than when the liquid-coolant is above said bottom plate.

43. An apparatus for cooling or freezing materials to low- and cryogenic-temperature levels comprising:

a) an external source of low-temperature or cryogenic-liquid coolant;

b) a closed insulated container;

c) one or more chambers within said container, each said chamber having a flat bottom, sides and a top within said container and at least one opening for entry and exit into said chamber, each said chamber being situated within said container so as to form coolant containment spaces around said chamber;

d) means for introducing said liquid coolant into said container to fill said coolant containment spaces to predetermined levels around said chambers;

e) a means of entry through said opening into each said chamber for positioning said materials into close proximity with said flat bottom of said chamber so as to allow gradient bottom-to-top heat absorption from said materials by said coolant through said flat bottom of said chamber for primary cooling of said materials to low-temperature or cryogenic-temperature levels; and f) a means for directing coolant vapors collected in said coolant containment spaces into each said chamber over said materials to provide additional cooling of said materials or to material cooling areas external to each said chamber.

44. An apparatus as recited in claim 43, further comprising:

a means for directing a portion of said liquid coolant in said coolant containment space into each said chamber over said materials to provide additional cooling of said materials.

45. An apparatus as recited in claim 44, wherein said means for directing said coolant vapors from said coolant containment space into each said chamber over said materials includes a vapor dispersion tube and spray nozzles.

46. An apparatus as recited in claim 45, wherein said means for directing coolant in said coolant containment space into each said chamber over said materials includes a means for utilizing the pressure in the coolant containment space to force said coolant into transfer lines penetrating said tunnel, said transfer lines being connected to liquid dispersion tubes and spray nozzles extending over the length of each said chamber.

47. An apparatus as recited in claim 26, further comprising:

a means for directing a portion of said liquid coolant in said coolant containment space into each said cooling chamber over said materials to provide additional cooling of said materials.

* * * * *

Disclaimer 5,520,004—Robert H. Jones, III, Lafayette, La. APPARATUS AND METHODS FOR CRYOGENIC TREATMENT OF MATERIALS. Patent dated May 28, 1996. Disclaimer filed May 24, 2002 by the inventor, Robert H. Jones, III.

Hereby enters this disclaimer to claims 1-47 of said patent.

*(Official Gazette, August 27, 2002)*